US012084836B2

(12) United States Patent
Igarashi et al.

(10) Patent No.: US 12,084,836 B2
(45) Date of Patent: Sep. 10, 2024

(54) WORK MACHINE

(71) Applicant: Hitachi Construction Machinery Co., Ltd., Tokyo (JP)

(72) Inventors: Teruki Igarashi, Tsuchiura (JP); Ryohei Fukuchi, Tsukuba (JP); Yusuke Suzuki, Teruki (JP); Hiroaki Tanaka, Kasumigaura (JP); Mitsuhiko Kanehama, Kasumigaura (JP)

(73) Assignee: Hitachi Construction Machinery Co., Ltd, Tokyo (JP)

( * ) Notice: Subject to any disclaimer, the term of this patent is extended or adjusted under 35 U.S.C. 154(b) by 0 days.

(21) Appl. No.: 18/279,224

(22) PCT Filed: Sep. 8, 2022

(86) PCT No.: PCT/JP2022/033805
§ 371 (c)(1),
(2) Date: Aug. 29, 2023

(87) PCT Pub. No.: WO2023/053900
PCT Pub. Date: Apr. 6, 2023

(65) Prior Publication Data

US 2024/0167250 A1 May 23, 2024

(30) Foreign Application Priority Data

Sep. 30, 2021 (JP) ................................ 2021-161526

(51) Int. Cl.
*E02F 9/22* (2006.01)
*E02F 3/32* (2006.01)
*F15B 19/00* (2006.01)

(52) U.S. Cl.
CPC .............. *E02F 9/2228* (2013.01); *E02F 3/32* (2013.01); *E02F 9/2267* (2013.01); *F15B 19/005* (2013.01)

(58) Field of Classification Search
CPC ................................ E02F 9/265; E02F 9/2228
See application file for complete search history.

(56) References Cited

U.S. PATENT DOCUMENTS 5,701,691 A 12/1997 Watanabe et al.
9,598,845 B2 * 3/2017 Baba .................... E02F 9/2033

(Continued)

FOREIGN PATENT DOCUMENTS

JP 10-8492 A 1/1998
JP 2018-528899 A 10/2018

(Continued)

OTHER PUBLICATIONS

International Preliminary Report on Patentability (PCT/IB/338 & PCT/IB373) issued in PCT Application No. PCT/JP2022/033805 dated Apr. 11, 2024, including English translation of Written Opinion (PCT/ISA/237) (5 pages).

(Continued)

*Primary Examiner* — Thomas E Lazo
(74) *Attorney, Agent, or Firm* — Crowell & Moring LLP

(57) ABSTRACT

A work machine includes: a work device including a plurality of hydraulic actuators and a plurality of driving target members; a posture sensor that senses posture information of the work device; a control valve unit that controls flows of hydraulic operating fluid supplied from the hydraulic pump to the plurality of hydraulic actuators; a plurality of solenoid valves that generate pilot pressure for driving the control valve unit; and a controller that computes a command value of the pilot pressure to be generated by the solenoid valves, and outputs a control signal corresponding to the command value to the solenoid valves. The controller computes a gravitational direction component of an action direction vector of the driving target members on the basis of the posture information sensed by the posture sensor, corrects the command value of the pilot pressure on the basis (Continued)

of the gravitational direction component of the action direction vector when the command value exceeds a predetermined pressure, and outputs the control signal corresponding to the command value after the correction to the solenoid valves.

8 Claims, 17 Drawing Sheets

(56) References Cited

U.S. PATENT DOCUMENTS

| | | | | |
|---|---|---|---|---|
| 9,834,905 | B2* | 12/2017 | Matsuyama | E02F 9/265 |
| 10,030,354 | B1* | 7/2018 | Dean | E02F 3/433 |
| 10,593,458 | B2* | 3/2020 | Mueller | B60T 8/17616 |
| 11,047,108 | B2* | 6/2021 | Matsuyama | E02F 9/2292 |
| 11,085,170 | B2* | 8/2021 | Roulston | E02F 3/841 |
| 11,453,995 | B2* | 9/2022 | Ito | E02F 3/437 |
| 2014/0121840 | A1* | 5/2014 | Mizuochi | G06F 30/15 700/275 |
| 2016/0281331 | A1* | 9/2016 | Ikegami | E02F 9/2285 |
| 2017/0089033 | A1 | 3/2017 | Matsuyama et al. | |
| 2018/0254134 | A1 | 9/2018 | Mueller et al. | |
| 2019/0032302 | A1 | 1/2019 | Matsuyama et al. | |
| 2020/0248430 | A1 | 8/2020 | Ito et al. | |
| 2022/0186459 | A1* | 6/2022 | Igarashi | E02F 3/435 |

FOREIGN PATENT DOCUMENTS

| | | | |
|---|---|---|---|
| JP | 2021-4540 | A | 1/2021 |
| WO | WO 95/33100 | A1 | 12/1995 |
| WO | WO 2016/035898 | A1 | 3/2016 |
| WO | WO 2019/012700 | A1 | 1/2019 |
| WO | WO 2019/202673 | A1 | 10/2019 |

OTHER PUBLICATIONS

International Search Report (PCT/ISA/210) issued in PCT Application No. PCT/JP2022/033805 dated Nov. 29, 2022 with English translation (5 pages).

Japanese-language Written Opinion (PCT/ISA/237) issued in PCT Application No. PCT/JP2022/033805 dated Nov. 29, 2022 with English translation (5 pages).

* cited by examiner

WORK MACHINE

TECHNICAL FIELD

The present invention relates to a work machine.

BACKGROUND ART

A work machine is known which includes: a plurality of hydraulic actuators that drive a boom, an arm, a bucket, and the like; a control valve unit for controlling the plurality of hydraulic actuators; a plurality of solenoid valves that generate pilot pressure for driving the control valve unit; and a controller that controls the solenoid valves. In such a work machine, a long delay time from the output of control signals from the controller to the solenoid valves to a start of driving of the hydraulic actuators may lead to a decrease in work accuracy.

As a method for reducing the delay time from the output of the control signals to the solenoid valves to the start of driving of the hydraulic actuators, Patent Document 1 discloses a method that quickly opens a solenoid valve by passing an overexciting current through a solenoid at a time of a start of driving of the solenoid valve, and feeding a holding current in order to hold a required hydraulic force after the opening of the valve.

PRIOR ART DOCUMENT

Patent Document

Patent Document 1: JP-2018-528899-A

SUMMARY OF THE INVENTION

Problem to be Solved by the Invention

However, with the technology described in Patent Document 1, the delay time from the output of the control signals to the solenoid valves by the controller to the driving of the hydraulic actuators may vary due to an effect of gravity of a work device. For example, as compared with a case where driving target members are actuated without opposing gravity, the work machine may have a longer delay time from the output of the control signals to the solenoid valves by the controller to the driving of the hydraulic actuators in a case where the driving target members are actuated against gravity. As a result, the work machine may not be able to perform work with high accuracy.

It is an object of the present invention to achieve an improvement in work accuracy by uniformizing variations in the delay time which variations are caused by the effect of gravity acting on the work device.

Means for Solving the Problem

A work machine according to one aspect of the present invention includes: a work device including a plurality of hydraulic actuators and a plurality of driving target members that are driven by the plurality of hydraulic actuators; a posture sensor that senses posture information of the work device; a hydraulic pump that supplies hydraulic operating fluid to the plurality of hydraulic actuators; a control valve unit that controls flows of the hydraulic operating fluid supplied from the hydraulic pump to the plurality of hydraulic actuators; a solenoid valve unit including a plurality of solenoid valves that generate pilot pressure for driving the control valve unit; and a controller configured to compute a command value of the pilot pressure to be generated by the solenoid valves, and output a control signal corresponding to the command value to the solenoid valves. The controller computes a gravitational direction component of an action direction vector of the driving target members on the basis of the posture information sensed by the posture sensor, corrects the command value of the pilot pressure on the basis of the gravitational direction component of the action direction vector when the command value exceeds a predetermined pressure, and outputs the control signal corresponding to the command value after the correction to the solenoid valves.

Advantages of the Invention

According to the present invention, an improvement in work accuracy can be achieved by uniformizing variations in delay time which variations are caused by an effect of gravity acting on the work device.

BRIEF DESCRIPTION OF THE DRAWINGS

FIG. 8 is a diagram showing relation between a target surface distance H and a control intervention ratio a.

MODES FOR CARRYING OUT THE INVENTION

Work machines according to embodiments of the present invention will be described with reference to the drawings.

FIRST EMBODIMENT

-Hydraulic Excavator-

Figure 1:
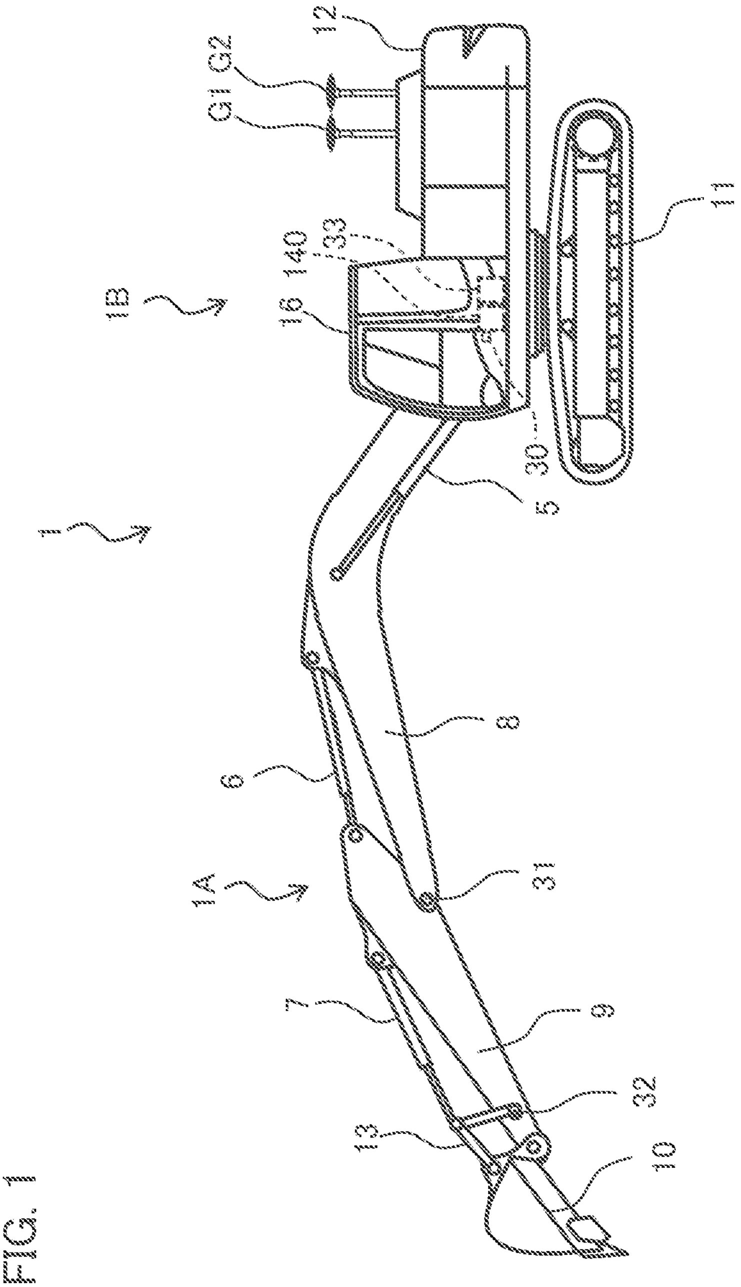
FIG. 1 is a side view of a hydraulic excavator according to a first embodiment of the present invention.

FIG. 1 is a side view of a hydraulic excavator 1 according to a first embodiment of the present invention. It is to be noted that while a hydraulic excavator having a bucket 10 as an attachment (work tool) attached to a distal end of a work device 1A will be illustrated and described in the present embodiment, the present invention can be applied also to a hydraulic excavator to which an attachment other than the bucket is attached.

As shown in FIG. 1, the hydraulic excavator 1 includes a machine body 1B and an articulated work device 1A attached to the machine body 1B. The machine body 1B includes a track structure 11 that is made to travel by a left and a right travelling motor (hydraulic motor) 3*a* and 3*b* (see FIG. 2) and a swing structure 12 swingably attached to the track structure 11. The work device 1A is attached to the swing structure 12. The swing structure 12 is swung with respect to the track structure 11 by a swing motor (hydraulic motor) 4 (see FIG. 2). The track structure 11 has a pair of left and right crawlers. The travelling motor 3*a* drives the crawler on the right side. The travelling motor 3*b* drives the crawler on the left side. The swing central axis of the swing structure 12 is vertical in a state in which the hydraulic excavator 1 is stopped on a horizontal ground. The swing structure 12 is provided with a cab 16. Installed within the cab 16 are electric operation devices A1 to A6 for operating the work device 1A, the track structure 11, and the swing structure 12. Mounted in the swing structure 12 are an engine 18 (see FIG. 2) as a prime mover, a main pump 2 (see FIG. 2) and a pilot pump 48 (see FIG. 2) driven by the engine 18, and a controller 140 that controls various parts of the hydraulic excavator 1.

The work device 1A includes a plurality of hydraulic cylinders (a boom cylinder 5, an arm cylinder 6, and a bucket cylinder 7) and a plurality of driving target members (a boom 8, an arm 9, and a bucket 10) to be driven by the plurality of hydraulic cylinders (5 to 7). The plurality of driving target members (8 to 10) are serially coupled to each other, and each rotate within a vertical plane. A proximal end portion of the boom 8 is rotatably coupled to a front portion of the swing structure 12 via a boom pin. The arm 9 is rotatably coupled to a distal end portion of the boom 8 via an arm pin. The bucket 10 is rotatably coupled to a distal end portion of the arm 9 via a bucket pin. The boom 8 is driven by the boom cylinder 5 as a hydraulic actuator. The arm 9 is driven by the arm cylinder 6 as a hydraulic actuator. The bucket 10 is driven by the bucket cylinder 7 as a hydraulic actuator.

A boom angle sensor 30 is attached to the boom pin. An arm angle sensor 31 is attached to the arm pin. A bucket angle sensor 32 is attached to a bucket link 13. A machine body inclination angle sensor 33 is attached to the swing structure 12. The angle sensors 30, 31, and 32 respectively sense information indicating rotational angles α, β, and γ (see FIG. 3) of the boom 8, the arm 9, and the bucket 10 as posture information of the work device 1A, and output a result of the sensing to the controller 140. The angle sensors 30, 31, and 32 are, for example, potentiometers that output signals (voltages) corresponding to the rotational angles of the driving target members. Incidentally, the angle sensors 30, 31, and 32 may be sensors of angles to the ground. The machine body inclination angle sensor 33 senses information indicating an inclination angle θ (see FIG. 3) of the swing structure 12 (machine body 1B) with respect to a reference plane (for example, a horizontal plane) as posture information of the swing structure 12, and outputs a result of the sensing to the controller 140. As the machine body inclination angle sensor 33, an IMU (Inertial Measurement Unit: inertial measurement device) can be adopted which obtains angular velocities and accelerations about three axes orthogonal to each other as information about the posture, computes the inclination angle θ on the basis of this information, and outputs a signal indicating the inclination angle θ to the controller 140. Incidentally, the computation of the inclination angle θ may be performed by the controller 140 on the basis of an output signal of the IMU.

Thus, the angle sensors 30 to 33 function as posture sensors that sense information about the posture of the hydraulic excavator 1. Incidentally, in place of the angle sensors 30 to 32, the posture sensors of the work device 1A may be sensors such as IMUs or the like capable of measuring inclination angles with respect to the reference plane. In addition, in place of the angle sensors 30 to 32, the posture sensors of the work device 1A may be stroke sensors that sense the strokes of the hydraulic cylinders.

The swing structure 12 is provided with a plurality of antennas for a GNSS (Global Navigation Satellite System: global satellite positioning system) (which antennas will hereinafter be described as GNSS antennas) G1 and G2. A positioning computing device (not shown) is connected to the GNSS antennas G1 and G2. The positioning computing device computes the position coordinates (positional information) of the swing structure 12 (machine body 1B) and the azimuth angle (azimuth information) of the swing structure 12 (machine body 1B) as an angle from a reference azimuth in a geographic coordinate system (global coordinate system) on the basis of satellite signals (GNSS radio waves) from a plurality of positioning satellites which satellite signals are received by the GNSS antennas G1 and G2. In addition, the positioning computing device computes the position of a reference point of the work device 1A in the geographic coordinate system (global coordinate system) on the basis of the information from the GNSS antennas G1 and G2. The positioning computing device outputs the positional information and the azimuth information of the swing structure 12 in the geographic coordinate system to the controller 140.

Incidentally, in the present embodiment, description will be made by taking, as an example, a case where the reference point of the work device 1A is set at a claw tip of the bucket 10. However, the position of the reference point can be changed as appropriate. For example, the reference point may be set at a back side surface (external surface) of the bucket 10 or at the bucket link 13. In addition, a point at a shortest distance to an excavation target surface in the whole of the bucket may be set as the reference point. In this case, the position of the reference point changes according to conditions.

-Hydraulic System-

Figure 2:
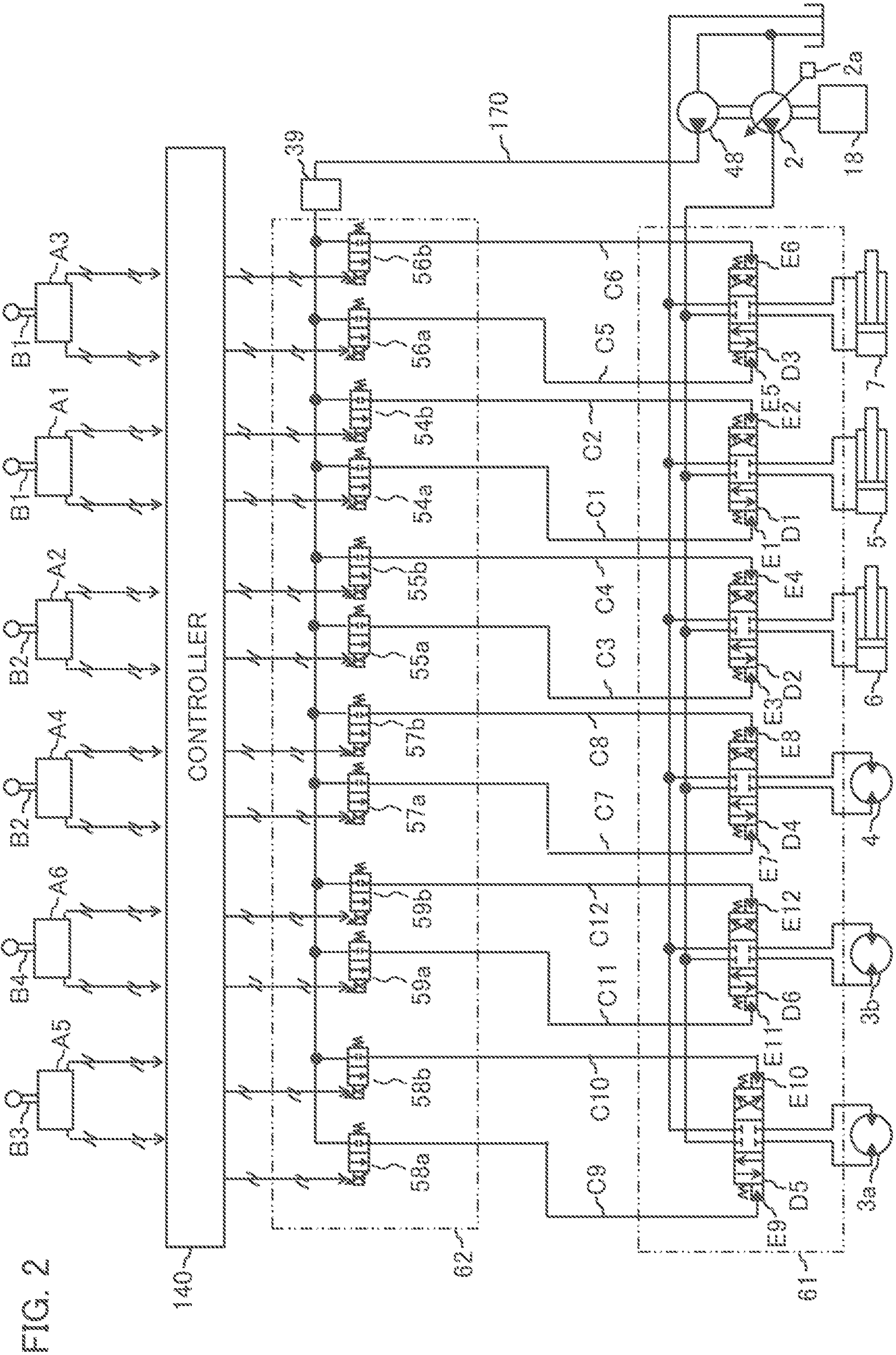
FIG. 2 is a diagram showing a hydraulic system possessed by the hydraulic excavator.

FIG. 2 is a diagram showing a hydraulic system possessed by the hydraulic excavator 1. As shown in FIG. 2, the hydraulic system includes the main pump 2, the pilot pump 48, a control valve unit 61, a solenoid valve unit 62, the boom cylinder 5 for driving the boom 8, the arm cylinder 6 for driving the arm 9, the bucket cylinder 7 for driving the bucket 10, the swing motor 4 for driving the swing structure 12, and the travelling motors 3*a* and 3*b* for driving the track structure 11.

The main pump 2 is a variable displacement hydraulic pump whose displacement is controlled by a regulator 2*a*. The main pump 2 is driven by the engine 18 to suck in hydraulic operating fluid within a tank and deliver the hydraulic operating fluid. The main pump 2 supplies the hydraulic operating fluid to the plurality of hydraulic actuators (3*a*, 3*b*, and 4 to 7). The pilot pump 48 is a fixed displacement hydraulic pump.

The control valve unit 61 includes a plurality of flow control valves D1 to D6 that control flows of the hydraulic operating fluid supplied from the main pump 2 to the plurality of hydraulic actuators (3*a*, 3*b*, and 4 to 7). The solenoid valve unit 62 includes a plurality of solenoid valves 54*a* to 59*b* that generate pilot pressures for driving the control valve unit 61. The pilot pressures generated by the solenoid valves 54*a* to 59*b* are raised as control currents supplied to solenoids of the solenoid valves 54*a* to 59*b* are increased.

The solenoid valves 54*a* to 59*b* are controlled by control signals output from the controller 140. The solenoid valves 54*a* to 59*b* are solenoid proportional pressure reducing valves that generate the pilot pressures for driving the flow control valves D1 to D6 by reducing a primary pressure as a delivery pressure of the pilot pump 48 to secondary pressures corresponding to the control signals from the controller 140. The controller 140 computes command values of the pilot pressures to be generated by the solenoid valves 54*a* to 59*b* on the basis of operation amounts and operation directions of the operation devices A1 to A6, and outputs the control signals (driving voltages) corresponding to the command values to the solenoid valves 54*a* to 59*b*. The solenoid valves 54*a* to 59*b* output the pilot pressures generated according to the operation directions and the operation amounts of the operation devices A1 to A6 to pressure receiving chambers (E1 to E12) of the flow control valves D1 to D6. Details of a method of computing the command values of the pilot pressures by the controller 140 will be described later.

The flow control valves D1 to D6 control flows of the hydraulic operating fluid supplied from the main pump 2 to the boom cylinder 5, the arm cylinder 6, the bucket cylinder 7, the swing motor 4, and the travelling motors 3*a* and 3*b*. The flow control valve D1 is driven by inputting the pilot pressures output from the solenoid valves 54*a* and 54*b* according to an operation of the operation device A1 to the pressure receiving chambers E1 and E2 through pilot lines C1 and C2. Thus, the flow control valve D1 drives the boom cylinder 5 by controlling the direction and flow rate of the hydraulic operating fluid supplied from the main pump 2 to the boom cylinder 5. The flow control valve D2 is driven by inputting the pilot pressures output from the solenoid valves 55*a* and 55*b* according to an operation of the operation device A2 to the pressure receiving chambers E3 and E4 through pilot lines C3 and C4. Thus, the flow control valve D2 drives the arm cylinder 6 by controlling the direction and flow rate of the hydraulic operating fluid supplied from the main pump 2 to the arm cylinder 6. The flow control valve D3 is driven by inputting the pilot pressures output from the solenoid valves 56*a* and 56*b* according to an operation of the operation device A3 to the pressure receiving chambers E5 and E6 through pilot lines C5 and C6. Thus, the flow control valve D3 drives the bucket cylinder 7 by controlling the direction and flow rate of the hydraulic operating fluid supplied from the main pump 2 to the bucket cylinder 7.

The flow control valve D4 is driven by inputting the pilot pressures output from the solenoid valves 57*a* and 57*b* according to an operation of the operation device A4 to the pressure receiving chambers E7 and E8 through pilot lines C7 and C8. Thus, the flow control valve D4 drives the swing motor 4 by controlling the direction and flow rate of the hydraulic operating fluid supplied from the main pump 2 to the swing motor 4. The flow control valve D5 is driven by inputting the pilot pressures output from the solenoid valves 58*a* and 58*b* according to an operation of the operation device A5 to the pressure receiving chambers E9 and E10 through pilot lines C9 and C10. Thus, the flow control valve D5 drives the travelling motor 3*a* by controlling the direction and flow rate of the hydraulic operating fluid supplied from the main pump 2 to the travelling motor 3*a*. The flow control valve D6 is driven by inputting the pilot pressures output from the solenoid valves 59*a* and 59*b* according to an operation of the operation device A6 to the pressure receiving chambers E11 and E12 through pilot lines C11 and C12. Thus, the flow control valve D6 drives the travelling motor 3*b* by controlling the direction and flow rate of the hydraulic operating fluid supplied from the main pump 2 to the travelling motor 3*b*.

The operation devices A1 and A3, for example, share a control lever B1 disposed on the right side of a cab seat. When the operation device A1 is operated by the control lever B1, the controller 140 actuates the solenoid valves 54*a* and 54*b*, and thereby drives the boom cylinder 5 (boom 8). When the operation device A3 is operated by the control lever B1, the controller 140 actuates the solenoid valves 56*a* and 56*b*, and thereby drives the bucket cylinder 7 (bucket 10). The operation devices A2 and A4, for example, share a control lever B2 disposed on the left side of the cab seat. When the operation device A2 is operated by the control lever B2, the controller 140 actuates the solenoid valves 55*a* and 55*b*, and thereby drives the arm cylinder 6 (arm 9). When the operation device A4 is operated by the control lever B2, the controller 140 actuates the solenoid valves 57*a* and 57*b*, and thereby drives the swing motor 4 (swing structure 12).

The operation device A5 has a control lever B3. The operation device A6 has a control lever B4. The control levers B3 and B4 are arranged side by side on a right side and a left side of a front of the cab seat. When the operation device A5 is operated by the control lever B3, the controller 140 actuates the solenoid valves 58*a* and 58*b*, and thereby drives the travelling motor 3*a* (crawler on the right side of the track structure 11). When the operation device A6 is operated by the control lever B4, the controller 140 actuates the solenoid valves 59*a* and 59*b*, and thereby drives the travelling motor 3*b* (crawler on the left side of the track structure 11).

The controller 140 drives the regulator 2*a* on the basis of the operation amounts of the operation devices A1 to A6, and thereby controls the delivery flow rate of the main pump 2.

A lock valve 39 is provided to a pump line 170 as a delivery pipe of the pilot pump 48. A downstream side of the lock valve 39 in the pump line 170 is branched into a plurality of the pilot lines C1 to C12, which are connected to the solenoid valves 54*a* to 59*b*. The lock valve 39 in the present embodiment is a solenoid selector valve. A solenoid of the lock valve 39 is electrically connected to a position sensor of a gate lock lever (not shown) disposed in the cab 16 (see FIG. 1) of the swing structure 12. The position of the gate lock lever is sensed by the position sensor, and a signal corresponding to the position of the gate lock lever is input from the position sensor to the lock valve 39. When the position of the gate lock lever is at a lock position, the lock valve 39 is closed, and thus the supply of the hydraulic operating fluid from the pilot pump 48 to the solenoid valves 54*a* to 59*b* is interrupted. When the position of the gate lock lever is at a lock release position, the lock valve 39 is opened, and thus the hydraulic operating fluid is supplied from the pilot pump 48 to the solenoid valves 54*a* to 59*b*. That is, in a state in which the pump line 170 is interrupted by the lock valve 39, an operation using each of the operation devices A1 to A6 is disabled, and an action of each of the hydraulic actuators (3*a*, 3*b*, and 4 to 7) is prohibited.

-Method of Computing Reference Point of Work Device-

Figure 3:
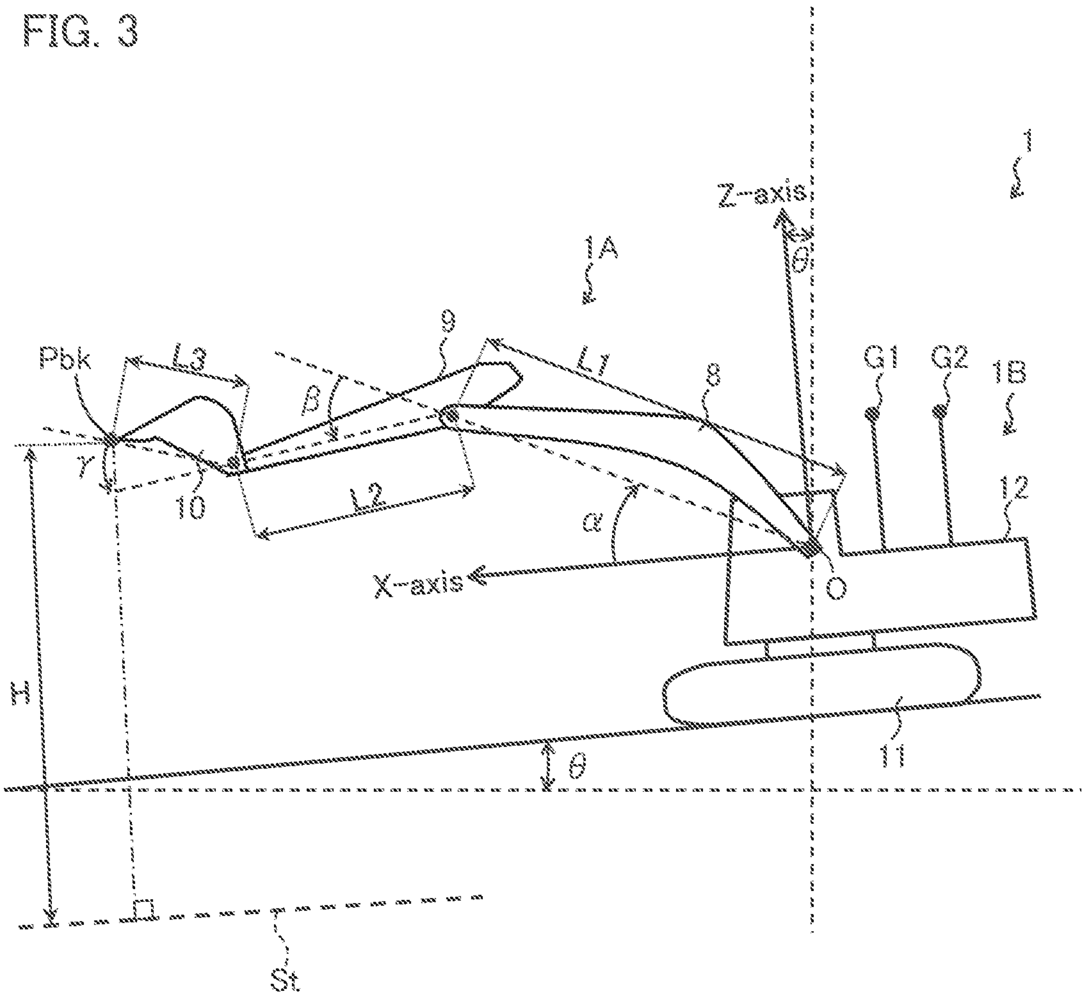
FIG. 3 is a diagram of assistance in explaining a method of computing a reference point of a work device.

FIG. 3 is a diagram of assistance in explaining a method of computing the reference point of the work device 1A. As shown in FIG. 3, the posture of the work device 1A can be defined by an excavator reference local coordinate system. The local coordinate system shown in FIG. 3 is a coordinate system set with the swing structure 12 as a reference. In this local coordinate system in the present embodiment, the pivot of the boom 8 (central point of the boom pin) is set as an origin O, a Z-axis is set in parallel with the swing central axis of the swing structure 12 (in a direction directly above the swing structure 12), and an X-axis is set in a direction orthogonal to the Z-axis (forward direction of the swing structure 12).

The boom angle α sensed by the boom angle sensor 30 described above is the inclination angle of the boom 8 with respect to the X-axis. The arm angle β sensed by the arm angle sensor 31 described above is the inclination angle of the arm 9 with respect to the boom 8. The bucket angle γ sensed by the bucket angle sensor 32 described above is the inclination angle of the bucket 10 with respect to the arm 9. The inclination angle θ sensed by the machine body inclination angle sensor 33 described above is the inclination angle of the machine body 1B (swing structure 12) with respect to the horizontal plane (reference plane).

The boom angle α is a value that becomes a minimum in a state in which the boom 8 is raised to an upper limit (the boom cylinder 5 is in a most extended state), and which becomes a maximum in a state in which the boom 8 is lowered to a lower limit (the boom cylinder 5 is in a most contracted state). The arm angle β is a value that becomes a minimum when the arm cylinder 6 is in a most contracted state, and which becomes a maximum when the arm cylinder 6 is in a most extended state. The bucket angle γ is a value that becomes a minimum when the bucket cylinder 7 is in a most contracted state (state shown in FIG. 3), and which becomes a maximum when the bucket cylinder 7 is in a most extended state.

The position (Xbk, Zbk) of a reference point Pbk of the work device 1A in the local coordinate system is expressed by the following Equations (1) and (2).

$$Xbk=L1\cos(\alpha)+L2\cos(\alpha+\beta)+L3\cos(\alpha+\beta+\gamma) \quad (1)$$

$$Zbk=L1\sin(\alpha)+L2\sin(\alpha+\beta)+L3\sin(\alpha+\beta+\gamma) \quad (2)$$

L1 is a length from the origin O (central point of the boom pin) to a coupling portion between the boom 8 and the arm 9 (central point of the arm pin). L2 is a length from the coupling portion between the arm 9 and the boom 8 (central point of the arm pin) to a coupling portion between the arm 9 and the bucket 10 (central point of the bucket pin). L3 is a length from the coupling portion between the arm 9 and the bucket 10 (central point of the bucket pin) to the reference point Pbk (claw tip of the bucket 10).

-Machine Control-

The controller 140 has an MC (Machine Control) function that intervenes in an operation of an operator and limits an action of the work device 1A under a certain condition when at least one of the operation devices A1 to A3 is operated. MC includes "area limiting control" and "stop control." The area limiting control is executed by the controller 140 when an arm operation is performed by the operation device A2 or when a boom operation is performed by the operation device A1. The stop control is executed by the controller 140 when a boom lowering operation is performed by the operation device A1 or when a bucket operation is performed by the operation device A3.

The area limiting control is referred to also as "ground leveling control." The area limiting control controls at least one of the boom cylinder 5, the arm cylinder 6, and the bucket cylinder 7 such that the work device 1A does not excavate an area on a lower side of a target surface St when an arm operation or a boom operation is performed by the operator. The claw tip of the bucket (reference point Pbk of the bucket 10) thereby moves along the target surface St. Specifically, when an arm operation is being performed, the controller 140 gives a command for a boom raising or boom lowering action such that a velocity vector of the claw tip of the bucket in a direction perpendicular to the target surface St is zero. In addition, the controller 140 also gives a command for decelerating the action of the arm 9 according to the arm operation by the operator. When a boom operation is being performed, the controller 140 gives an action command for arm crowding or arm dumping. The trajectory of the claw tip of the bucket which trajectory is formed by an arm action or a boom action as a rotating movement is thereby corrected to a linear trajectory along the target surface St.

The stop control controls at least one of the boom cylinder 5 and the bucket cylinder 7 such that the claw tip of the bucket (reference point Pbk of the bucket 10) does not enter an area below the target surface St when a boom lowering operation is performed by the operator. A boom lowering action or a bucket action is thereby stopped before the claw tip of the bucket enters the area below the target surface St. In the stop control, the controller 140 decelerates the boom lowering action or the bucket action as the claw tip of the bucket approaches the target surface St.

The MC includes "automatic control," which controls the action of the work device 1A by the controller 140 during non-operation of the operation devices A1 to A3, and "semiautomatic control," which controls the action of the work device 1A by the controller 140 during operation of the operation devices A1 to A3. Incidentally, the semiautomatic control is referred to also as "intervening control" because the control by the controller 140 intervenes in the operation performed by the operator, according to positional relation between the target surface St and the bucket 10. In the following, an operation state in which the work device 1A is being actuated under the intervening control will be described as a "semiautomatic operation state." An operation state in which the work device 1A is being actuated according to the operation amounts and the operation directions of the operation devices A1 to A4 without the intervening control being performed will be referred to as a "manual operation state."

-Controller (Hardware)-

Figure 4:
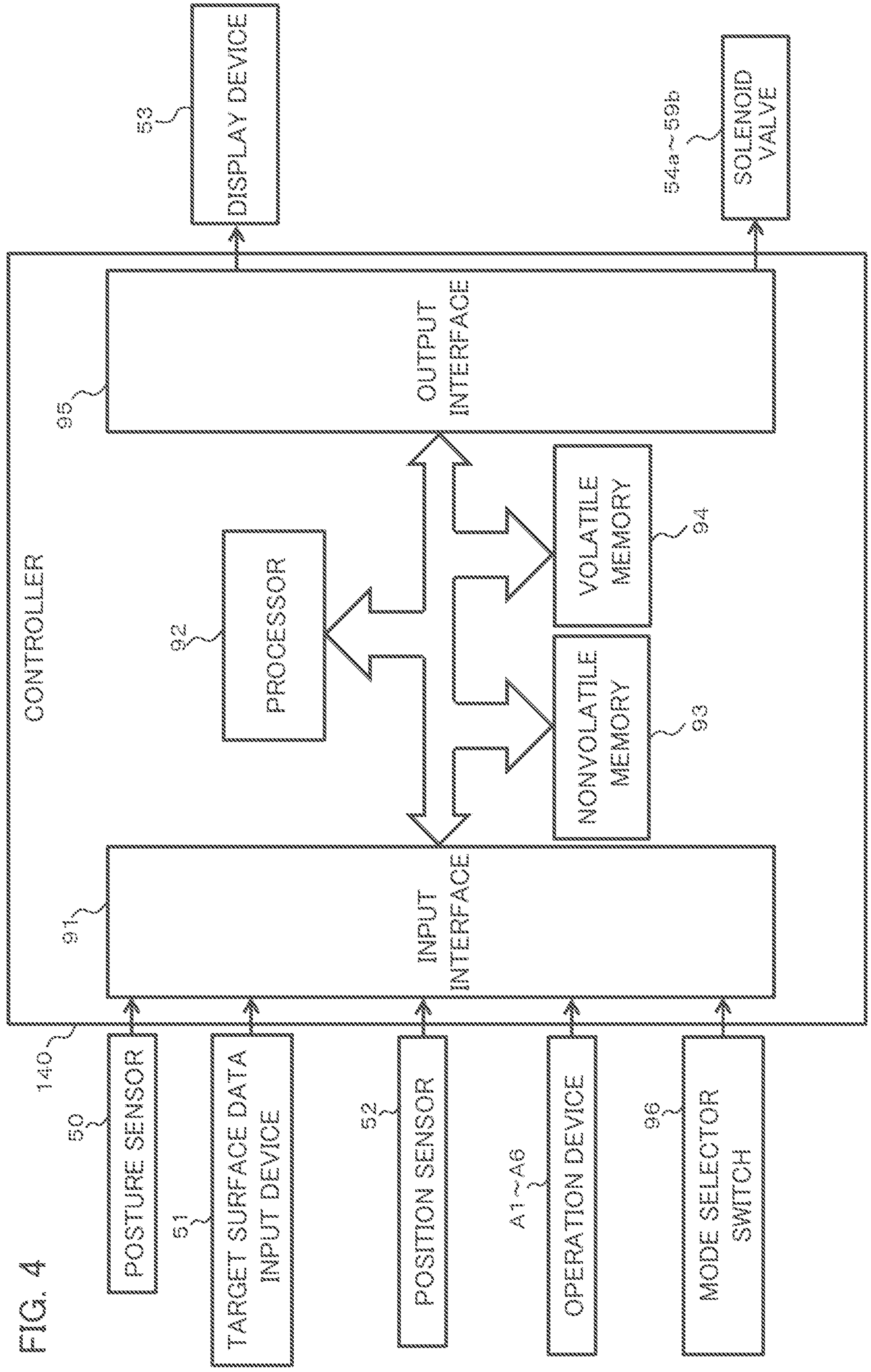
FIG. 4 is a diagram of a hardware configuration of a controller of the hydraulic excavator.

FIG. 4 is a diagram of a hardware configuration of the controller 140 of the hydraulic excavator 1. As shown in FIG. 4, the controller 140 is connected with a posture sensor 50, a target surface data input device 51, a position sensor 52, the operation devices A1 to A6, a mode selector switch 96, a display device 53, and the solenoid valves 54*a* to 59*b*.

The controller 140 is constituted by a computer including a processor 92 such as a CPU (Central Processing Unit), an MPU (Micro Processing Unit), or a DSP (Digital Signal Processor), a nonvolatile memory 93 such as a ROM (Read Only Memory), a flash memory, or a hard disk drive as a magnetic storage device, a volatile memory 94 referred to as a so-called RAM (Random Access Memory), an input interface 91, an output interface 95, and other peripheral circuitry. Incidentally, the controller 140 may be constituted by one computer, or may be constituted by a plurality of computers.

The nonvolatile memory 93 stores information such as programs and data necessary for performing various kinds of processing, the programs including a control program for implementing the MC function. That is, the nonvolatile memory 93 is a storage medium (storage device) from which a program for implementing functions of the present embodiment is readable. The processor 92 is a processing device that expands the program stored in the nonvolatile memory 93 into the volatile memory 94, and executes the program by computation. The processor 92 performs predetermined computation processing on data captured from the input interface 91, the nonvolatile memory 93, and the volatile memory 94 according to the program.

The input interface 91 converts signals input from respective devices (the posture sensor 50, the target surface data input device 51, the position sensor 52, the operation devices A1 to A6, the mode selector switch 96, and the like) into data that can be subjected to computation by the processor 92. In addition, the output interface 95 generates signals for output according to a result of the computation in the processor 92, and outputs the signals to respective devices (the display device 53, the solenoid valves 54*a* to 59*b*, and the like). The devices (the display device 53, the solenoid valves 54*a* to 59*b*, and the like) are thereby actuated.

Figure 5:
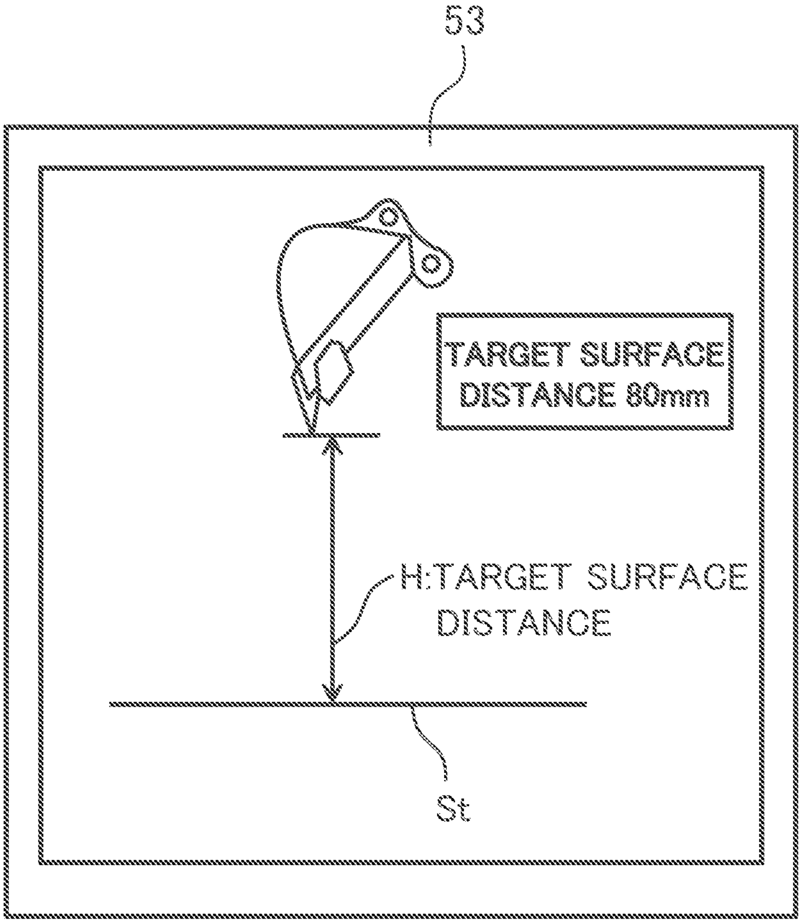
FIG. 5 is a diagram showing an example of a display screen of a display device.

The display device 53 is, for example, a liquid crystal monitor of a touch panel type. The display device 53 is installed within the cab 16. FIG. 5 is a diagram showing an example of a display screen of the display device 53. As shown in FIG. 5, the display device 53 displays various display images on the display screen on the basis of display control signals from the controller 140. The controller 140 can display a display image indicating positional relation between the target surface St and the work device 1A (for example, the bucket 10) on the display screen of the display device 53. Displayed in the example shown in the figure are an image showing the target surface St and the bucket 10 and a distance (hereinafter also described as a target surface distance) H from the target surface St to the reference point Pbk (for example, the claw tip) of the bucket 10. The target surface distance H assumes a positive value in an upward direction and assumes a negative value in a downward direction with the target surface St as a reference. The operator can operate the work device 1A while referring to the display screen of the display device 53. Thus, the controller 140 controls the display device 53 to display information necessary for an operation performed by the operator, information prompting the operator for a predetermined operation, or the like on the display screen of the display device 53. That is, the controller 140 has a machine guidance function that assists in the operator's operation.

The posture sensor 50 shown in FIG. 4 includes the boom angle sensor 30, the arm angle sensor 31, the bucket angle sensor 32, and the machine body inclination angle sensor 33 described above. These angle sensors (30, 31, 32, and 33) obtain information about the posture of the work device 1A, and output a signal corresponding to the information. The operation devices A1 to A6 have operation sensors that sense the operation directions and the operation amounts of the control levers B1 to B4. The operation devices A1 to A6 output sensing results of the operation sensors as operation signals to the controller 140.

The target surface data input device 51 is an interface that can input target shape data (the position of the target surface St, the inclination angle of the target surface St with respect to the reference plane (horizontal plane), and the like) to the controller 140. For example, the target surface data input device 51 is a nonvolatile memory such as a flash memory or a hard disk drive as a magnetic storage device that stores three-dimensional target shape data defined in the geographic coordinate system (absolute coordinate system). In addition, the target surface data input device 51 may be a device including a communication device capable of communicating with an external terminal (not shown) and a computer that can obtain the three-dimensional target shape data from the external terminal by controlling the communication device, and update three-dimensional data within a nonvolatile memory.

The position sensor 52 includes the plurality of GNSS antennas G1 and G2 and the positioning computing device (not shown) described above. The position sensor 52 senses the positional information and the azimuth information of the machine body 1B in the geographic coordinate system, and outputs a sensing result to the controller 140. The mode selector switch 96 is an input device that sets a control mode (work mode). The mode selector switch 96 is installed within the cab 16. The mode selector switch 96 is a switch for selecting a ground leveling control mode in which the controller 140 performs the ground leveling control, a stop control mode in which the controller 140 performs the stop control, a manual control mode in which the controller 140 does not perform either of the ground leveling control and the stop control, and an automatic driving control mode in which the controller 140 performs the control of a predetermined action.

-Controller (Function)-

Figure 6:
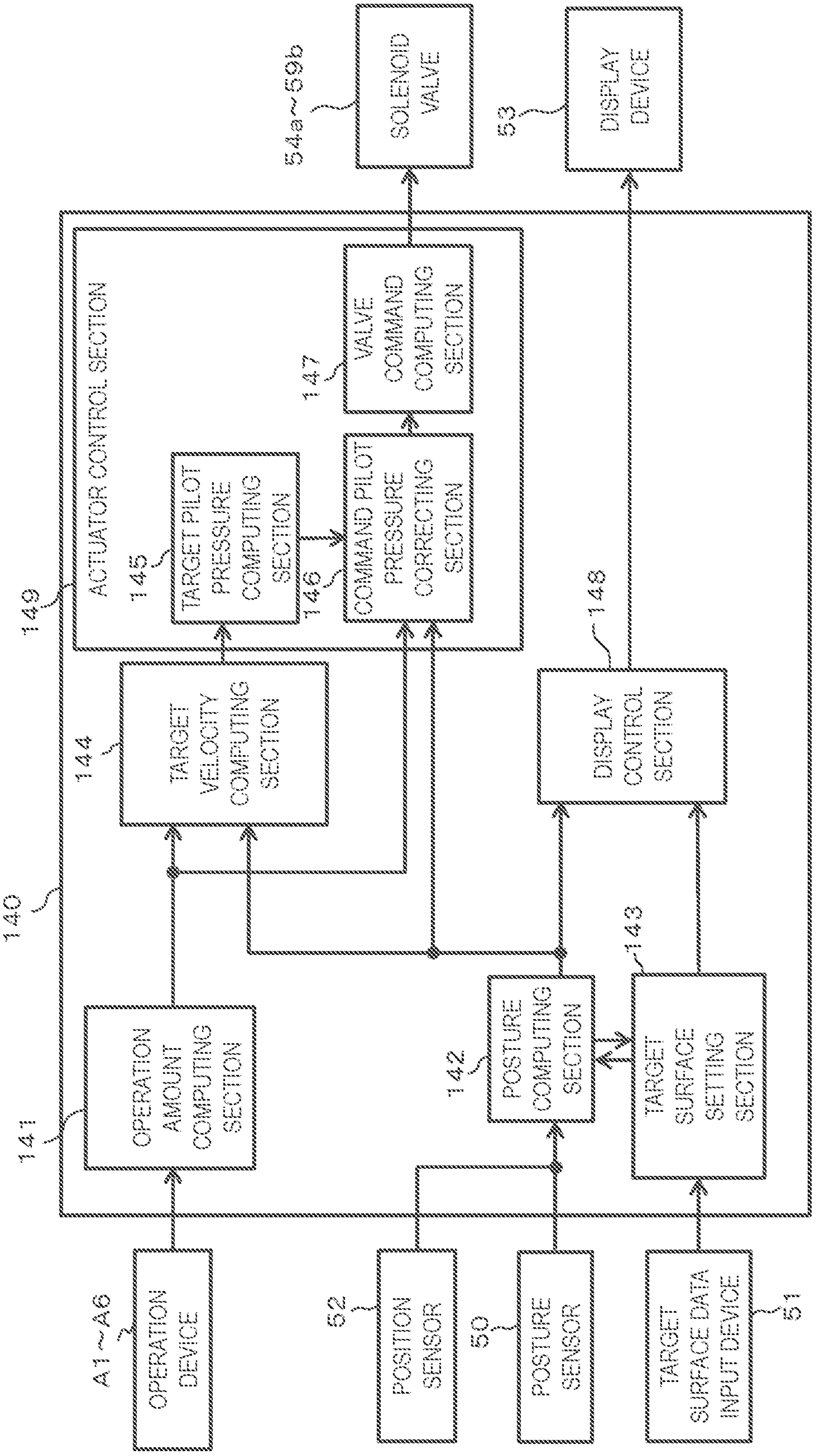
FIG. 6 is a functional block diagram of the controller according to the first embodiment of the present invention.

Main functions of the controller 140 will be described with reference to FIG. 6 and the like. FIG. 6 is a functional block diagram of the controller 140. The controller 140 functions as an operation amount computing section 141, a posture computing section 142, a target surface setting section 143, a target velocity computing section 144, a target pilot pressure computing section 145, a command pilot pressure correcting section 146, a valve command computing section 147, and a display control section 148 by executing a program stored in the nonvolatile memory 93 as the storage device. The target pilot pressure computing section 145, the command pilot pressure correcting section 146, and the valve command computing section 147 function as an actuator control section 149 that controls the hydraulic actuators (3*a*, 3*b*, and 4 to 7) by controlling the solenoid valves 54*a* to 59*b*.

-Operation Amount Computing Section-

The operation amount computing section 141 calculates operation pilot pressures PiBMU0 and PiBMD0 made to act on the pressure receiving chambers E1 and E2 of the flow control valve D1 on the basis of an operation signal for boom raising or boom lowering which operation signal is output from the operation device A1. The operation amount computing section 141 calculates operation pilot pressures PiAMC0 and PiBMD0 made to act on the pressure receiving chambers E3 and E4 of the flow control valve D2 on the basis of an operation signal for arm crowding (arm pulling) and arm dumping (arm pushing) which operation signal is output from the operation device A2. The operation amount computing section 141 calculates operation pilot pressures PiBKC0 and PiBKD0 made to act on the pressure receiving chambers E5 and E6 of the flow control valve D3 on the basis of an operation signal for bucket crowding (bucket excavation) and bucket dumping (bucket soil discharge) which operation signal is output from the operation device A3.

The operation amount computing section 141 calculates operation pilot pressures PiSR0 and PiSL0 made to act on the pressure receiving chambers E7 and E8 of the flow control valve D4 on the basis of an operation signal for a right swing or a left swing which operation signal is output from the operation device A4. The operation amount computing section 141 calculates operation pilot pressures PiRF0 and PiRR0 made to act on the pressure receiving chambers E9 and E10 of the flow control valve D5 on the basis of an operation signal for advancing a right track structure or reversing the right track structure which operation signal is output from the operation device A5. The operation amount computing section 141 calculates operation pilot pressures PiLF0 and PiLR0 made to act on the pressure receiving chambers E11 and E12 of the flow control valve D6 on the basis of an operation signal for advancing a left track structure or reversing the left track structure which operation signal is output from the operation device A6. Thus, the operation amount computing section 141 computes the operation pilot pressures PiBMU0, PiBMD0, PiAMC0, PiAMD0, PiBKC0, and PiBKD0 as first command values of the pilot pressures to be generated by the solenoid valves 54*a* to 59*b* on the basis of the operation amounts of the operation devices A1 to A6.

-Posture Computing Section-

The posture computing section 142 computes the boom angle $\alpha$, the arm angle R, the bucket angle $\gamma$, and the inclination angle (pitch angle) el on the basis of the posture information sensed by the posture sensor 50. The posture computing section 142 computes the posture of the work device 1A and the reference point Pbk (Xbk, Zbk) of the bucket 10 in the local coordinate system (excavator reference coordinate system) on the basis of the boom angle $\alpha$, the arm angle R, and the bucket angle $\gamma$ as well as the dimensions (L1, L2, L3) of the respective parts of the work device 1A, the dimensions being stored in the nonvolatile memory 93. As already described, the reference point Pbk (Xbk, Zbk) of the bucket 10 can be computed by Equation (1) and Equation (2). When the posture of the work device 1A and the position of the reference point Pbk of the bucket 10 in the geographic coordinate system are necessary, the posture computing section 142 calculates the position and the posture of the swing structure 12 in the geographic coordinate system on the basis of the positional information and the azimuth information of the swing structure 12 in the geographic coordinate system, the positional information and the azimuth information being sensed by the position sensor 52, and the inclination angle of the machine body 1B, the inclination angle being sensed by the posture sensor 50. The posture computing section 142 thereby transforms coordinates in the local coordinate system into coordinates in the geographic coordinate system.

The posture computing section 142 computes the target surface distance H as a distance from the reference point Pbk of the bucket 10 to the target surface St set by the target surface setting section 143 to be described later.

Incidentally, the target surface distance H may be a distance in a vertical direction between the reference point Pbk of the bucket 10 and the target surface St, or may be a shortest distance between the reference point Pbk of the bucket 10 and the target surface St.

-Target Surface Setting Section-

The target surface setting section 143 obtains three-dimensional target shape data from the target surface data input device 51. The target surface setting section 143 computes the positional information of the target surface St on the basis of the target shape data, and stores a result of the computation in the volatile memory 94 as a storage device. The target surface setting section 143 sets a sectional shape of the target shape data sectioned by an action plane of the work device 1A as the target surface St (two-dimensional target surface shown in FIG. 3), and computes the positional information of the target surface St.

The action plane of the work device 1A is computed on the basis of the position coordinates of respective parts of the work device 1A in the geographic coordinate system which position coordinates are computed by the posture computing section 142. Incidentally, as described above, the position coordinates of the respective parts of the work device 1A are computed on the basis of the positional information of the machine body 1B and the posture information of the hydraulic excavator 1. That is, the target surface setting section 143 sets the target surface St on the basis of the target shape data obtained from the target surface data input device 51 as well as the positional information of the machine body 1B and the posture information of the hydraulic excavator 1.

Incidentally, while there is one target surface St in the example shown in FIG. 3, there may be a plurality of target surfaces St. When there are a plurality of target surfaces St, a target surface St nearest to the reference point Pbk of the bucket 10, for example, may be set as the target surface St, a target surface St located vertically downward of the reference point Pbk of the bucket 10 may be set as the target surface St, or an optionally selected target surface St may be set as the target surface St.

Display Control Section-

The display control section 148 shown in FIG. 6 generates a display control signal for displaying, on the display screen of the display device 53, an image (see FIG. 5) showing positional relation between the target surface St set by the target surface setting section 143 and the reference point of the bucket 10 (bucket claw tip) which reference point is computed by the posture computing section 142. The display control section 148 outputs the generated display control signal to the display device 53.

Target Velocity Computing Section-

The target velocity computing section 144 computes a target value of an extension or contraction velocity of each hydraulic cylinder (5, 6, 7) (which target value will hereinafter be described also as a target velocity) on the basis of a result of computation in the posture computing section 142 and a result of computation in the operation amount computing section 141. When the area limiting control (ground leveling control) mode is set by the mode selector switch 96 (see FIG. 4), the target velocity computing section 144 computes the target velocity of each hydraulic cylinder (5, 6, 7) such that the work device 1A does not excavate the ground beyond the target surface St.

Figure 7:
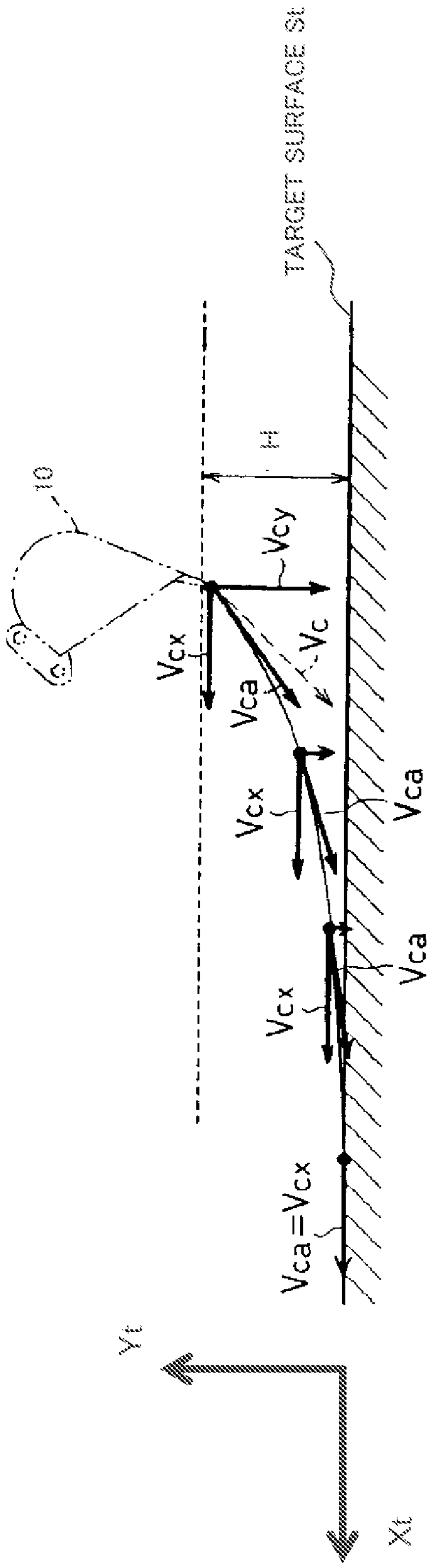
FIG. 7 is a diagram showing an example of the trajectory of a claw tip of a bucket when the claw tip of the bucket is controlled according to a target velocity vector Vca after correction.

In the following, a method of computing the target velocity in the ground leveling control will be described in detail with reference to FIG. 7. FIG. 7 is a diagram showing an example of the trajectory of the claw tip of the bucket 10 when the claw tip of the bucket 10 is controlled according to a target velocity vector Vca after correction. In the description here, as shown in the figure, an Xt axis and a Yt axis are set. The Xt axis is an axis parallel with the target surface St. The Yt axis is an axis orthogonal to the target surface St.

The target velocity computing section 144 computes a primary target velocity of each hydraulic cylinder (5, 6, 7) on the basis of the operation pilot pressures computed by the operation amount computing section 141. The target velocity computing section 144 computes a target velocity vector Vc of the claw tip of the bucket 10 on the basis of the primary target velocity of each hydraulic cylinder (5, 6, 7), the position of the claw tip (reference point Pbk) of the bucket 10 which position is computed by the posture computing section 142, and the dimensions (L1, L2, L3, and the like) of the respective parts of the work device 1A which dimensions are stored in the nonvolatile memory 93. The target velocity computing section 144 computes a secondary target velocity by correcting the primary target velocity according to the target surface distance H as a distance between the claw tip of the bucket 10 and the target surface St. The target velocity computing section 144 computes the secondary target velocity(s) of a necessary hydraulic cylinder(s) among the hydraulic cylinders (5, 6, 7) such that a component Vcy orthogonal to the target surface St in the target velocity vector Vc of the claw tip of the bucket 10 (velocity component in a Yt axis direction) approaches 0 (zero) as the target surface distance H approaches 0 (zero). The velocity vector Vc of the claw tip of the bucket 10 is thereby converted into Vca. The target velocity vector Vca ($\neq 0$) when the target surface distance H is 0 (zero) includes only a component Vcx (velocity component in an Xt axis direction) parallel with the target surface St. Consequently, the claw tip of the bucket 10 is maintained above the target surface St or in an area on the upper side of the target surface St such that the claw tip of the bucket 10 does not enter an area on the lower side of the target surface St.

Thus, the target velocity computing section 144 performs control that converts the velocity vector Vc into Vca (which control will hereinafter be described also as direction changing control). When an arm crowding operation is performed singly by the operation device A2, for example, the direction changing control converts the velocity vector Vc into Vca by extending the arm cylinder 6 and extending the boom cylinder 5. Incidentally, as required, the target velocity computing section 144 corrects the primary target velocity of the arm cylinder 6 which primary target velocity is computed on the basis of the operation pilot pressure of the arm 9, and thereby computes a secondary target velocity lower than the primary target velocity. An arm crowding action is thereby decelerated. It is therefore possible to prevent the bucket 10 from crossing the target surface St and excavating the ground to below the target surface St without a boom raising action being performed in time.

The direction changing control may be performed by a combination of boom raising or boom lowering and arm crowding, and may be performed by a combination of boom raising or boom lowering and arm dumping. In either case, when the target velocity vector Vc includes a downward component ($Vcy<0$) approaching the target surface St, the target velocity computing section 144 computes the target velocity of the boom cylinder 5 in a boom raising direction for canceling the downward component. When the target velocity vector Vc includes an upward component ($Vcy>0$) separating from the target surface St, in contrast, the target velocity computing section 144 computes the target velocity of the boom cylinder 5 in a boom lowering direction for canceling the upward component.

Incidentally, when the manual control mode is set by the mode selector switch 96 (see FIG. 4), the target velocity computing section 144 computes the target velocity of each hydraulic cylinder (5 to 7) according to an operation of each of the operation devices A1 to A3. That is, when the manual control mode is set, the target velocity computing section 144 does not perform the direction changing control.

-Target Pilot Pressure Computing Section-

The target pilot pressure computing section 145 shown in FIG. 6 converts each target velocity computed by the target velocity computing section 144 into a target pilot pressure on the basis of relation between pilot pressures made to act on the flow control valves D1 to D3 of the respective hydraulic cylinders (5 to 7) and the extension or contraction velocities of the respective hydraulic cylinders (5 to 7), which relation is stored in the nonvolatile memory 93. The target pilot pressure computing section 145 computes target pilot pressures PiBMU1 and PiBMD1 on the basis of the target velocity of the boom cylinder 5 which target velocity corresponds to a boom raising action or a boom lowering action. The target pilot pressure computing section 145 computes target pilot pressures PiAMC1 and PiAMD1 on the basis of the target velocity of the arm cylinder 6 which target velocity corresponds to an arm crowding action or an arm dumping action. The target pilot pressure computing section 145 computes target pilot pressures PiBKC1 and PiBKD1 on the basis of the target velocity of the bucket cylinder 7 which target velocity corresponds to a bucket crowding action or a bucket dumping action. Thus, the target pilot pressure computing section 145 computes the target pilot pressures PiBMU1, PiBMD1, PiAMC1, PiAMD1, PiBKC1, and PiBKD1 as second command values of the pilot pressures to be generated by the solenoid valves 54*a* to 56*b* on the basis of the target velocities computed by the target velocity computing section 144.

-Command Pilot Pressure Correcting Section-

The command pilot pressure correcting section 146 computes command pilot pressures PiBMU2, PiBMD2, PiAMC2, PiAMD2, PiBKC2, and PiBKD2 by correcting the operation pilot pressures PiBMU0, PiBMD0, PiAMC0, PiBMD0, PiBKC0, and PiBKD0 computed by the operation amount computing section 141 and the target pilot pressures PiBMU1, PiBMD1, PiAMC1, PiAMD1, PiBKC1, and PiBKD1 computed by the target pilot pressure computing section 145 on the basis of the computation result of the posture computing section 142. In the following, a method of computing the command pilot pressures will be described in detail.

In the following, the operation pilot pressures PiBMU0, PiBMD0, PiAMC0, PiBMD0, PiBKC0, and PiBKD0 will be collectively described as an operation pilot pressure Pi0, and the target pilot pressures PiBMU1, PiBMD1, PiAMC1, PiAMD1, PiBKC1, and PiBKD1 will be collectively described as a target pilot pressure Pi1.

When the operation pilot pressure Pi0 exceeds an actuator non-driving corresponding pressure ps and reaches an actuator driving corresponding pressure (Pi0>ps), the command pilot pressure correcting section 146 makes a correction that temporarily raises the operation pilot pressure Pi0. The command pilot pressure correcting section 146 assumes that the intervening control is not performed, and computes corrected operation pilot pressures PiBMU0', PiBMD0', PiAMC0', PiBMD0', PiBKC0', and PiBKD0' for reducing a delay time from the application of the control currents corresponding to the operation of the operation devices A1 to A3 to the solenoid valves 54*a* to 56*b* to the driving of the hydraulic cylinders (5 to 7). The corrected operation pilot pressures PiBMU0', PiBMD0', PiAMC0', PiBMD0', PiBKC0', and PiBKD0' are values larger than the operation pilot pressures PiBMU0, PiBMD0, PiAMC0, PiBMD0, PiBKC0, and PiBKD0. As will be described later, the command pilot pressure correcting section 146 makes the corrected operation pilot pressures PiBMU0', PiBMD0', PiAMC0', PiBMD0', PiBKC0', and PiBKD0' gradually approach the operation pilot pressures PiBMU0, PiBMD0, PiAMC0, PiBMD0, PiBKC0, and PiBKD0 with the passage of time.

When the target pilot pressure Pi1 exceeds the actuator non-driving corresponding pressure ps and reaches the actuator driving corresponding pressure (Pi1>ps), the command pilot pressure correcting section 146 makes a correction that temporarily raises the target pilot pressure Pi1. The command pilot pressure correcting section 146 assumes that the intervening control is performed, and computes corrected target pilot pressures PiBMU1', PiBMD1', PiAMC1', PiAMD1', PiBKC1', and PiBKD1' for making constant a delay time from the application of the control currents corresponding to commands of the controller 140 to the solenoid valves 54*a* to 56*b* to the driving of the hydraulic cylinders (5 to 7) irrespective of the posture of the driving target members (8 to 10). The corrected target pilot pressures PiBMU1', PiBMD1', PiAMC1', PiAMD1', PiBKC1', and PiBKD1' are values larger than the respective target pilot pressures PiBMU1, PiBMD1, PiAMC1, PiAMD1, PiBKC1, and PiBKD1. As will be described later, the command pilot pressure correcting section 146 makes the corrected target pilot pressures PiBMU1', PiBMD1', PiAMC1', PiAMD1', PiBKC1', and PiBKD1' gradually approach the target pilot pressures PiBMU1, PiBMD1, PiAMC1, PiAMD1, PiBKC1, and PiBKD1 with the passage of time.

In the following, the corrected operation pilot pressures PiBMU0', PiBMD0', PiAMC0', PiAMD0', PiBKC0', and PiBKD0' will be collectively described as a corrected operation pilot pressure Pi0', and the corrected target pilot pressures PiBMU1', PiBMD1', PiAMC1', PiAMD1', PiBKC1', and PiBKD1' will be collectively described as a corrected target pilot pressure Pi1'.

Figure 8:
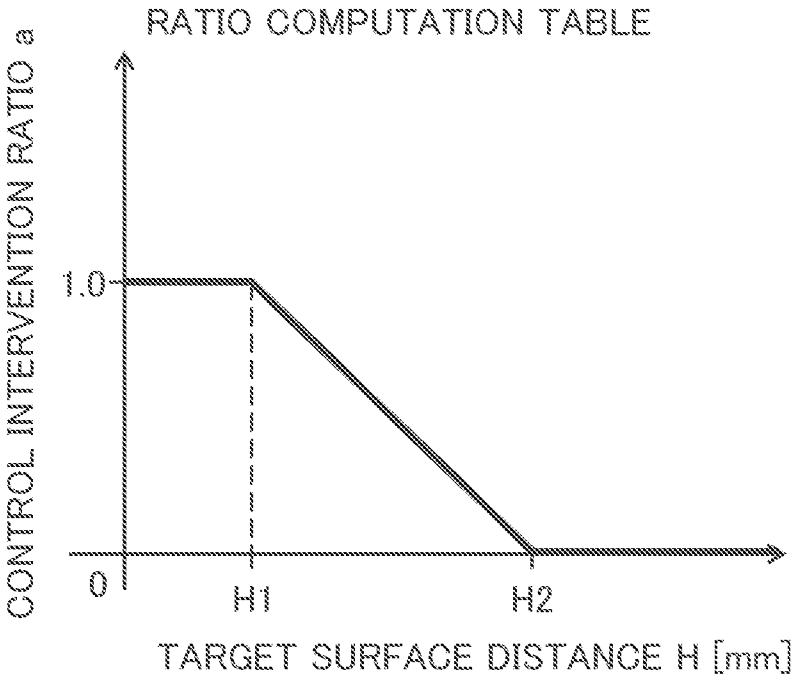

The command pilot pressure correcting section 146 computes a control intervention ratio (pilot ratio) a according to the target surface distance H in order to perform arbitration between the corrected operation pilot pressure Pi0' and the corrected target pilot pressure Pi1'. FIG. 8 is a diagram showing relation between the target surface distance H and the control intervention ratio a. In FIG. 8, an axis of abscissas indicates the target surface distance H, and an axis of ordinates indicates the control intervention ratio a. As shown in FIG. 8, the control intervention ratio a is 0.0 when the target surface distance H is equal to or more than a second distance H2 (for example, 1000 mm). The control intervention ratio a is 1.0 when the target surface distance H is equal to or less than a first distance H1 (for example, 300 mm). The control intervention ratio a is increased as the target surface distance H is decreased in a range from the first distance H1 to the second distance H2. The relation between the target surface distance H and the control intervention ratio a which relation is shown in FIG. 8 is stored in a table format in the nonvolatile memory 93. The command pilot pressure correcting section 146 refers to a ratio computation table shown in FIG. 8, and computes the control intervention ratio a on the basis of the target surface distance H computed by the posture computing section 142.

The command pilot pressure correcting section 146 shown in FIG. 6 computes a command pilot pressure Pi2 by the following Equation (3):

$$Pi2=Pi0'\times(1-a)+Pi1'\times a \quad (3)$$

The command pilot pressure Pi2 computed by Equation (3), that is, PiBMU2, PiBMD2, PiAMC2, PiAMD2, PiBKC2, and PiBKD2 are used for computation in the valve command computing section 147. As indicated by Equation (3), the control intervention ratio a is a parameter for determining a degree of effect produced on the command pilot pressure Pi2 by each of the corrected target pilot pressure Pi1' and the corrected operation pilot pressure Pi0'. The higher the control intervention ratio a, the larger the degree of effect produced on the command pilot pressure Pi2 by the corrected target pilot pressure Pi1', and the smaller the degree of effect produced on the command pilot pressure Pi2 by the corrected operation pilot pressure Pi0'. A method of computing the corrected operation pilot pressure Pi0' and the corrected target pilot pressure Pi1' by the command pilot pressure correcting section 146 will be described later in detail.

Incidentally, the command pilot pressure correcting section 146 computes command pilot pressures PiSR2, PiSL2, PiRF2, PiRR2, PiLF2, and PiLR2 by correcting the operation pilot pressures PiSR0, PiSL0, PiRF0, PiRR0, PiLF0, and PiLR0 computed by the operation amount computing section 141 and corresponding to operation signals for a right swing, a left swing, advancing the right track structure, reversing the right track structure, advancing the left track structure, and reversing the left track structure, on the basis of the computation result of the posture computing section 142.

The correction of the operation pilot pressures PiSR0, PiSL0, PiRF0, PiRR0, PiLF0, and PiLR0 is similar to the above-described correction of PiBMU0, PiBMD0, PiAMC0, PiBMD0, PiBKC0, and PiBKD0, and therefore description thereof will be omitted. The command pilot pressure correcting section 146 computes, as the command pilot pressures PiSR2, PiSL2, PiRF2, PiRR2, PiLF2, and PiLR2, the operation pilot pressures PiSR0', PiSL0', PiRF0', PiRR0', PiLF0', and PiLR0' after the correction which operation pilot pressures correspond to the operation signals for a right swing, a left swing, advancing the right track structure, reversing the right track structure, advancing the left track structure, and reversing the left track structure.

-Valve Command Computing Section-

The valve command computing section 147 computes control current values on the basis of the command pilot pressures PiBMU2, PiBMD2, PiAMC2, PiAMD2, PiBKC2, PiBKD2, PiSR2, PiSL2, PiRF2, PiRR2, PiLF2, and PiLR2 computed by the command pilot pressure correcting section 146. The valve command computing section 147 outputs control signals (driving voltages) to the solenoid valves 54*a* to 59*b* such that control currents corresponding to a result of the computation flow to the solenoids of the solenoid valves 54*a* to 59*b*. The solenoid valves 54*a* to 59*b* thereby generate pilot pressures corresponding to the command pilot pressures. The flow control valves D1 to D6 are actuated when the pilot pressures generated by the solenoid valves 54*a* to 59*b* act on the pressure receiving chambers E1 to E12 of the flow control valves D1 to D6.

For example, when an arm crowding operation intended for horizontal excavation is performed in a state in which the ground leveling control mode is set, the solenoid valves 54*a* and 55*a* are controlled such that the claw tip of the bucket 10 does not enter an area below the target surface St. In this case, an arm crowding decelerating action and a boom raising action are automatically synthesized with an arm crowding action corresponding to the operation of the operator. As a result, a horizontal excavation action is performed by only the arm crowding operation.

-Corrected Operation Pilot Pressure Pi0' and Corrected Target Pilot Pressure Pi1'-

Description will be made of details of a method of computing the corrected operation pilot pressure Pi0' and the corrected target pilot pressure Pi1' by the command pilot pressure correcting section 146. The command pilot pressure correcting section 146 determines whether or not the operation pilot pressure Pi0 and the target pilot pressure Pi1 have exceeded the actuator non-driving corresponding pressure ps (for example, 0.3 MPa). The actuator non-driving corresponding pressure ps is a pressure slightly lower than a pilot pressure (actuator driving corresponding pressure) at which the hydraulic actuators (3*a*, 3*b*, and 4 to 7) start to be actuated. The actuator non-driving corresponding pressure ps is stored in the nonvolatile memory 93 in advance. The actuator non-driving corresponding pressure ps is determined for each of the hydraulic actuators (3*a*, 3*b*, and 4 to 7).

The command pilot pressure correcting section 146 determines that the operation pilot pressure Pi0 has exceeded the actuator non-driving corresponding pressure ps when the operation pilot pressure Pi0 changes from a state of being equal to or lower than the actuator non-driving corresponding pressure ps to a state of being higher than the actuator non-driving corresponding pressure ps. The command pilot pressure correcting section 146 corrects the operation pilot pressure Pi0 from a time point at which the operation pilot pressure Pi0 is determined to have exceeded the actuator non-driving corresponding pressure ps. When the operation pilot pressure Pi0 exceeds the actuator non-driving corresponding pressure ps, the command pilot pressure correcting section 146 computes the corrected operation pilot pressure Pi0' higher than the operation pilot pressure Pi0.

Similarly, the command pilot pressure correcting section 146 determines that the target pilot pressure Pi1 has exceeded the actuator non-driving corresponding pressure ps when the target pilot pressure Pi1 changes from a state of being equal to or lower than the actuator non-driving corresponding pressure ps to a state of being higher than the actuator non-driving corresponding pressure ps. The command pilot pressure correcting section 146 corrects the target pilot pressure Pi1 from a time point at which the target pilot pressure Pi1 is determined to have exceeded the actuator non-driving corresponding pressure ps. When the target pilot pressure Pi1 exceeds the actuator non-driving corresponding pressure ps, the command pilot pressure correcting section 146 computes the corrected target pilot pressure Pi1' higher than the target pilot pressure Pi1.

Figure 9A:
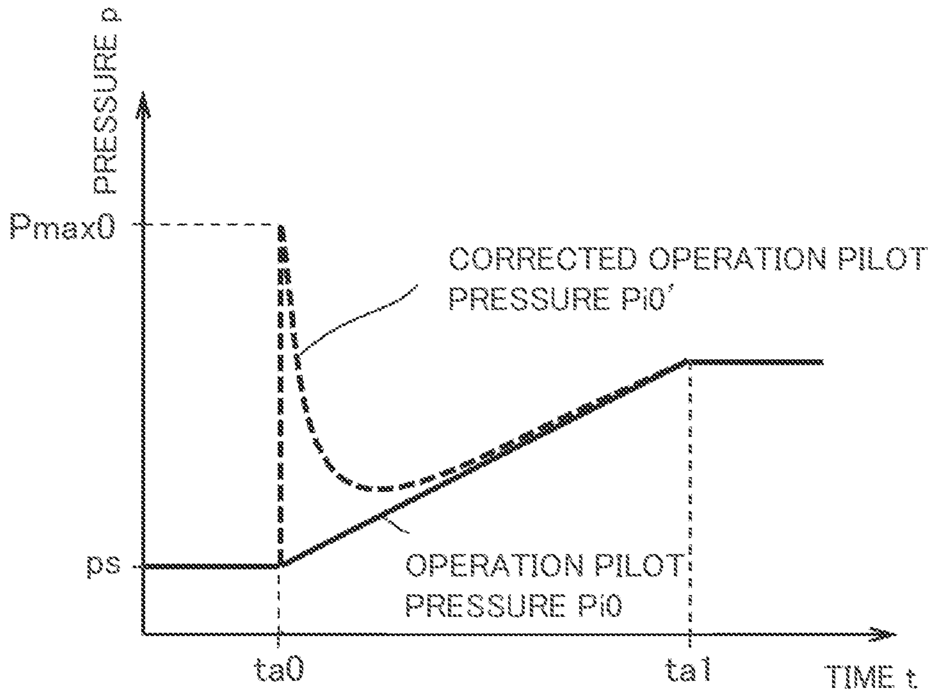
FIG. 9A is a diagram schematically showing a time history waveform of an operation pilot pressure Pi0 and a corrected operation pilot pressure Pi0'.
Figure 9B:
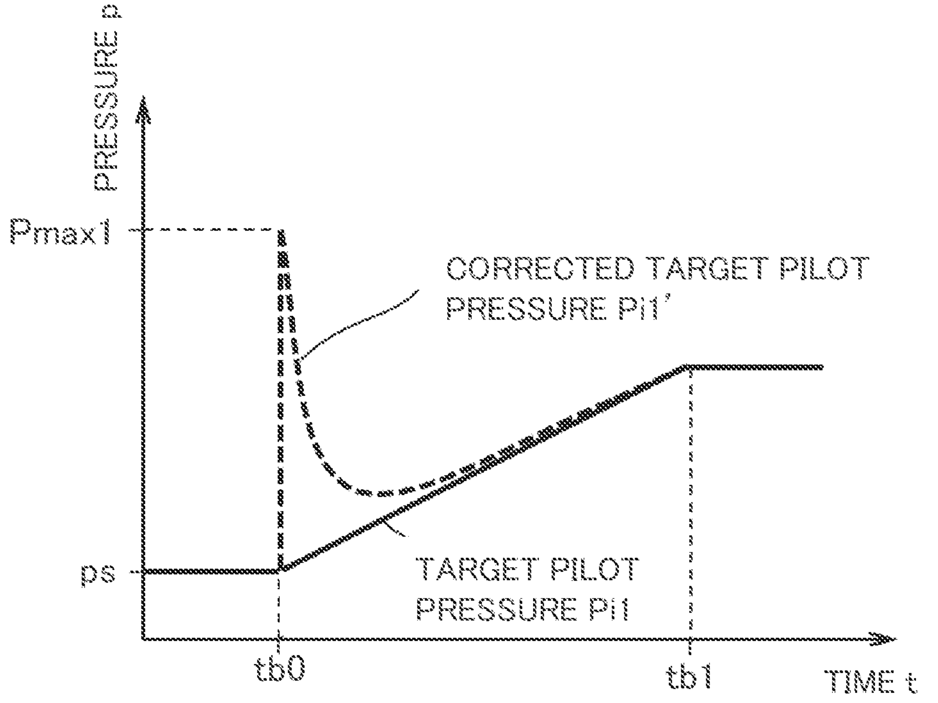
FIG. 9B is a diagram schematically showing a time history waveform of a target pilot pressure Pi1 and a corrected target pilot pressure Pi1'.

FIG. 9A is a diagram schematically showing the time history waveforms of the operation pilot pressure Pi0 and the corrected operation pilot pressure Pi0'. FIG. 9B is a diagram schematically showing the time history waveforms of the target pilot pressure Pi1 and the corrected target pilot pressure Pi1'.

As indicated by a solid line in FIG. 9A, the operation pilot pressure Pi0 starts to rise from the actuator non-driving corresponding pressure ps at a time point ta0. Therefore, as indicated by a broken line in FIG. 9A, the correction of the operation pilot pressure Pi0 is started at the time point ta0.

The time point ta0 is a time at which the operation pilot pressure Pi0 changes from a state of being equal to or lower than the actuator non-driving corresponding pressure ps to a state of being higher than the actuator non-driving corresponding pressure ps. In the following, the time point ta0 will be described as a driving start time point. Letting τa be an elapsed time from this driving start time point ta0 to time t (that is, τa=t−ta0), the command pilot pressure correcting section 146 computes the corrected operation pilot pressure Pi0' by the following Equation (4).

$$Pi0' = (P\max 0 - Pi0)\exp(-Ka\cdot\tau a) + Pi0 \tag{4}$$

A corrected pressure Pmax0 is an output pressure at t=ta0, and is a maximum output pressure in a usage range of the solenoid valves 54*a* to 56*b*. Ka is a predetermined positive value. A function exp(x) represents an exponential function having a Napier's constant as a base of an exponent and having x as the exponent.

A first term on the right side of Equation (4) includes an exponential function exp(−Ka·τa), and the exponent thereof is expressed by a product of the elapsed time τa from the driving start time point ta0 and a constant value. Hence, at the driving start time point ta0, the elapsed time τa is 0, and the exponential function exp(−Ka·τa) is 1. Thus, the corrected operation pilot pressure Pi0' is the corrected pressure Pmax0.

The exponential function exp(−Ka·τa) has exp(−Ka) as a base, and has Ta as an exponent. In addition, Ka is a predetermined positive value. Thus, exp(−Ka) is a value smaller than 1. Hence, the exponential function exp(−Ka·τa) gradually approaches 0 (zero) as the elapsed time Ta from the driving start time point ta0 increases. Therefore, the corrected operation pilot pressure Pi0' gradually approaches the operation pilot pressure Pi0 as the elapsed time Ta increases, and at a time point ta1, a difference between the corrected operation pilot pressure Pi0' and the operation pilot pressure Pi0 is substantially 0. Incidentally, a degree in which the corrected operation pilot pressure Pi0' gradually approaches the operation pilot pressure Pi0 can be adjusted by changing the predetermined value Ka. Incidentally, a value common to each of the hydraulic cylinders (5 to 7) may be set as the predetermined value Ka, or a value different for each of the hydraulic cylinders (5 to 7) may be set as the predetermined value Ka.

As shown in FIG. 9A, the corrected pressure Pmax0 is a maximum value of the corrected operation pilot pressure Pi0' in a control range in which correction is made from the time point ta0 to the time point ta1. The delay time from the application of control currents to the solenoid valves 54*a* to 56*b* to the driving of the hydraulic cylinders (5 to 7) can be made to decrease as the corrected pressure Pmax0 is increased. As the corrected pressure Pmax0, a parameter different for each of the hydraulic cylinders (5 to 7) is set so as to match an operation feeling at a time of a start of operation of each hydraulic cylinder (5 to 7). Incidentally, as the corrected pressure Pmax0, a parameter common to each of the hydraulic cylinders (5 to 7) may be set.

As indicated by a solid line in FIG. 9B, the target pilot pressure Pi1 starts to rise from the actuator non-driving corresponding pressure ps at a time point tb0. Therefore, as indicated by a broken line in FIG. 9B, the correction of the target pilot pressure Pi1 is started at the time point tb0.

The time point tb0 is a time at which the target pilot pressure Pi1 changes from a state of being equal to or lower than the actuator non-driving corresponding pressure ps to a state of being higher than the actuator non-driving corresponding pressure ps. In the following, the time point tb0 will be described as a driving start time point. Letting τb be an elapsed time from this driving start time point tb0 to time t (that is, τb=t−tb0), the command pilot pressure correcting section 146 computes the corrected target pilot pressure Pi1' by the following Equation (5).

$$Pi1' = (Pmax1 - Pi1)\exp(-Kb \cdot \tau b) + Pi1 \quad (5)$$

A corrected pressure Pmax1 is an output pressure at t=tb0. Kb is a predetermined positive value. A function exp(x) represents an exponential function having a Napier's constant as a base of an exponent and having x as the exponent.

A first term on the right side of Equation (5) includes an exponential function exp(−Kb·τb), and the exponent thereof is expressed by a product of the elapsed time τb from the driving start time point tb0 and a constant value. Hence, at the driving start time point tb0, the elapsed time τb is 0, and the exponential function exp(−Kb·τb) is 1. Thus, the corrected target pilot pressure Pi1' is the corrected pressure Pmax1.

The exponential function exp(−Kb·τb) has exp(−Kb) as a base, and has τb as an exponent. In addition, Kb is a predetermined positive value. Thus, exp(−Kb) is a value smaller than 1. Hence, the exponential function exp(−Kb·τb) gradually approaches 0 (zero) as the elapsed time τb from the driving start time point tb0 increases. Therefore, the corrected target pilot pressure Pi1' gradually approaches the target pilot pressure Pi1 as the elapsed time τb increases, and at a time point tb1, a difference between the corrected target pilot pressure Pi1' and the target pilot pressure Pi1 is substantially 0. Incidentally, a degree in which the corrected target pilot pressure Pi1' gradually approaches the target pilot pressure Pi1 can be adjusted by changing the predetermined value Kb. Incidentally, a value common to each of the hydraulic cylinders (5 to 7) may be set as the predetermined value Kb, or a value different for each of the hydraulic cylinders (5 to 7) may be set as the predetermined value Kb.

As shown in FIG. 9B, the corrected pressure Pmax1 is a maximum value of the corrected operation pilot pressure Pi0' in a control range in which correction is made from the time point tb0 to the time point tb1. The corrected pressure Pmax1 is set to make constant the delay time from the application of control currents to the solenoid valves 54*a* to 56*b* to the driving of the hydraulic cylinders (5 to 7) irrespective of the posture of the work device 1A when the area limiting control is performed. The corrected pressure Pmax1 is computed on the basis of the posture of the driving target members (8 to 10) constituting the work device 1A.

Figure 10:
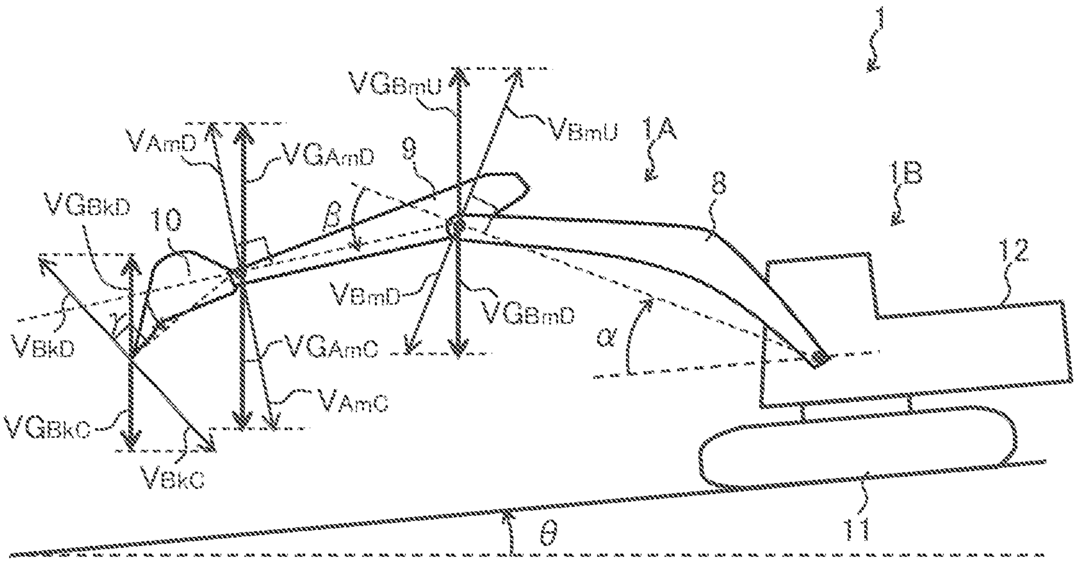
FIG. 10 is a diagram showing action direction vectors of driving target members and gravitational direction components thereof.

A method of computing the corrected pressure Pmax1 will be described in detail. FIG. 10 is a diagram showing action direction vectors of the driving target members (8 to 10) and gravitational direction components thereof. As shown in FIG. 10, the command pilot pressure correcting section 146 computes action direction vectors VBmU, VBmD, VAmC, VAmD, VBkC, and VBkD of the respective driving target members (8 to 10) on the basis of a computation result in the posture computing section 142. In the following, the action direction vectors VBmU, VBmD, VAmC, VAmD, VBkC, and VBkD will be collectively described also as an action direction vector VD.

The action direction vector VBmU is a unit vector in an action direction of the distal end portion of the boom 8 where a boom raising action is assumed. The operation direction vector VBmD is a unit vector in an action direction of the distal end portion of the boom 8 where a boom lowering action is assumed. The action direction vectors VBmU and VBmD extend from the arm pin in directions orthogonal to a line segment connecting the boom pin and the arm pin to each other. The action direction vector VAmC is a unit vector in an action direction of the distal end portion of the arm 9 where an arm crowding action is assumed. The action direction vector VAmD is a unit vector in an action direction of the distal end portion of the arm 9 where an arm dumping action is assumed. The action direction vectors VAmC and VAmD extend from the bucket pin in directions orthogonal to a line segment connecting the arm pin and the bucket pin to each other. The action direction vector VBkC is a unit vector in an action direction of the distal end portion (claw tip) of the bucket 10 where a bucket crowding action is assumed. The action direction vector VBkD is a unit vector in an action direction of the distal end portion (claw tip) of the bucket 10 where a bucket dumping action is assumed. The action direction vectors VBkC and VBkD extend from the claw tip of the bucket in directions orthogonal to a line segment connecting the bucket pin and the claw tip of the bucket to each other.

The command pilot pressure correcting section 146 computes gravitational direction components VGBmU, VGBmD, VGAmC, VGAmD, VGBkC, and VGBkD of the action n direction vectors of the driving target members (8 to 10) by the following Equations (6) to (11) on the basis of the computation result of the posture computing section 142.

$$VGBmU = VBmU\cos(\alpha+\theta) \quad (6)$$

$$VGBmD = VBmD\cos(\alpha+\theta) \quad (7)$$

$$VGAmC = VAmC\cos(\alpha+\beta+\theta) \quad (8)$$

$$VGAmD = VAmD\cos(\alpha+\beta+\theta) \quad (9)$$

$$VGBkC = VBkC\cos(\alpha+\beta+\gamma+\theta) \quad (10)$$

$$VGBkD = VBkD\cos(\alpha+\beta+\gamma+\theta) \quad (11)$$

α is the boom angle computed by the posture computing section 142. β is the arm angle computed by the posture computing section 142. γ is the bucket angle computed by the posture computing section 142. θ is the inclination angle (pitch angle) in a front-rear direction of the swing structure 12 (machine body 1B) which inclination angle is computed by the posture computing section 142.

In the present embodiment, the gravitational direction components VGBmU, VGBmD, VGAmC, VGAmD, VGBkC, and VGBkD of the action direction vector VD are negative values when the gravitational direction components are in a direction of gravity (vertically downward direction), and the gravitational direction components VGBmU, VGBmD, VGAmC, VGAmD, VGBkC, and VGBkD are positive values when the gravitational direction components are in an opposite direction (vertically upward direction) from the direction of gravity. The gravitational direction components VGBmU, VGBmD, VGAmC, VGAmD, VGBkC, and VGBkD of the action direction vector VD can be represented by numerical values of −1.0 to 1.0. In the following, the gravitational direction components VGBmU, VGBmD, VGAmC, VGAmD, VGBkC, and VGBkD of the action direction vector VD will be collectively described also as a gravitational direction component VG.

Figure 11:
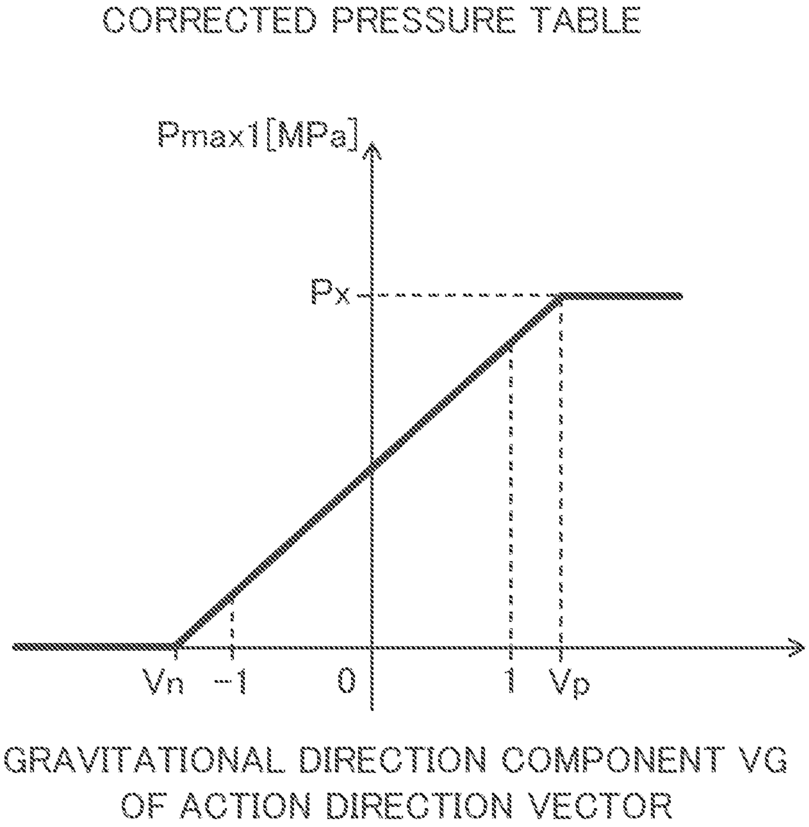
FIG. 11 is a diagram showing relation between a gravitational direction component of an action direction vector and a corrected pressure.

FIG. 11 is a diagram showing relation between the gravitational direction component VG of the action direction vector VD and the corrected pressure Pmax1. In FIG. 11, an axis of abscissas indicates the gravitational direction component VG of the action direction vector VD, and an axis of ordinates indicates the corrected pressure Pmax1. As shown in FIG. 11, the corrected pressure Pmax1 is 0 (zero) when the gravitational direction component VG of the action direction vector VD is equal to or less than a predetermined value Vn, and the corrected pressure Pmax1 is Px (>0) when the gravitational direction component VG of the action direction vector VD is equal to or more than a predetermined value Vp. The corrected pressure Pmax1 is raised as the value of the gravitational direction component VG of the action direction vector VD is increased in a range from the predetermined value Vn to the predetermined value Vp. Incidentally, the predetermined value Vn is a value equal to or less than −1, and the predetermined value Vp is a value equal to or more than 1.

The relation between the gravitational direction component VG of the action direction vector VD and the corrected pressure Pmax1 which relation is shown in FIG. 11 is stored in a table format in the nonvolatile memory 93. The command pilot pressure correcting section 146 refers to a corrected pressure table shown in FIG. 11, and computes the corrected pressure Pmax1 on the basis of the gravitational direction component VG of the action direction vector VD.

The command pilot pressure correcting section 146 computes the action direction vector VD, the gravitational direction component VG thereof, and the corrected pressure Pmax1 repeatedly in predetermined control cycles irrespective of states of operation of the operation devices A1 to A3 by the operator. That is, the command pilot pressure correcting section 146 computes the action direction vector VD, the gravitational direction component VG thereof, and the corrected pressure Pmax1 at all times including times when the operation devices A1 to A3 are not operated.

When the gravitational direction component VG of the action direction vector VD is a positive value, the driving target members (8 to 10) are actuated against gravity. Hence, when the corrected pressure Pmax1 is a fixed value irrespective of the posture of the hydraulic excavator 1, the larger the gravitational direction component VG of the action direction vector VD which gravitational direction component has a positive value, the larger the delay time from the application of control currents to the solenoid valves 54*a* to 56*b* to an actual start of driving of the hydraulic cylinders (5 to 7).

When the gravitational direction component VG of the action direction vector VD is a negative value, the driving target members (8 to 10) are actuated without opposing gravity. Hence, when the corrected pressure Pmax1 is a fixed value irrespective of the posture of the hydraulic excavator 1, the smaller the gravitational direction component VG of the action direction vector VD which gravitational direction component has a negative value (the larger the absolute value of the gravitational direction component VG), the smaller the delay time from the application of control currents to the solenoid valves 54*a* to 56*b* to an actual start of driving of the hydraulic cylinders (5 to 7).

When the target pilot pressure Pi1 exceeds the actuator non-driving corresponding pressure ps, the controller 140 according to the present embodiment raises the corrected pressure Pmax1 as the gravitational direction component VG of the action direction vector VD is increased. The target pilot pressure Pi1 is thereby corrected on the basis of the gravitational direction component VG of the action direction vector VD. Hence, the delay time from the application of control currents to the solenoid valves 54*a* to 56*b* to an actual start of driving of the hydraulic cylinders (5 to 7) can be reduced as the gravitational direction component VG of the action direction vector VD is increased. As a result, the delay time of the actuators that are actuated in a gravitational direction can be made uniform irrespective of the posture of the work device 1A.

As the corrected pressure table shown in FIG. 11, a table different for each of the hydraulic cylinders (5 to 7) is set on the basis of an actually measured value of the delay time of each of the hydraulic cylinders (5 to 7) and in consideration of a balance between the delay times of the respective hydraulic cylinders (5 to 7). Incidentally, a table common to each of the hydraulic cylinders (5 to 7) may be set.

Here, as a comparative example of the present embodiment, in a case where the corrected pressure Pmax1 is a fixed value irrespective of the posture and the action direction of the work device 1A, the delay time is decreased when the driving target members (8 to 10) are actuated in the gravitational direction, whereas the delay time is increased when the driving target members (8 to 10) are actuated in an opposite direction from the gravitational direction. That is, in the comparative example, the delay time varies according to the posture and the action direction of the work device 1A. There is thus a fear of being unable to move the work device 1A along the target surface St with high accuracy at a time of a start of movement of the work device 1A.

In the present embodiment, in contrast, the corrected pressure Pmax1 is adjusted according to the posture and the action direction of the work device 1A. Therefore, the delay time from the output of control signals to the solenoid valves 54*a* to 56*b* to a start of driving of the hydraulic cylinders (5 to 7) can be made uniform irrespective of the posture and the action direction of the driving target member, so that the work device 1A can be moved along the target surface St with high accuracy at a time of a start of movement of the work device 1A.

-Effects-

The foregoing embodiment produces the following actions and effects.

(1) The hydraulic excavator (work machine) 1 includes: the work device 1A including the plurality of hydraulic actuators (the boom cylinder 5, the arm cylinder 6, and the bucket cylinder 7) and the plurality of driving target members (the boom 8, the arm 9, and the bucket 10) that are driven by the plurality of hydraulic actuators; the posture sensor 50 that senses the posture information (the boom angle, the arm angle, and the bucket angle) of the work device 1A and the posture information (machine body inclination angle) of the swing structure 12; the main pump (hydraulic pump) 2 that supplies the hydraulic operating fluid to the plurality of hydraulic actuators; the control valve unit 61 that controls flows of the hydraulic operating fluid supplied from the main pump 2 to the plurality of hydraulic actuators; the solenoid valve unit 62 including the plurality of solenoid valves 54*a* to 56*b* that generate pilot pressure for driving the control valve unit 61; and the controller 140 that computes the command pilot pressure Pi2 as the command value of the pilot pressure to be generated by the solenoid valves 54*a* to 56*b*, and outputs a control signal corresponding to the command pilot pressure Pi2 to the solenoid valves 54*a* to 56*b*.

The controller 140 computes the operation pilot pressure Pi0 as a first command value of the pilot pressure to be generated by the solenoid valves 54*a* to 56*b* on the basis of the operation amounts of the operation devices A1 to A3. The controller 140 computes the target pilot pressure Pi1 as a second command value of the pilot pressure to be generated by the solenoid valves 54*a* to 56*b*, such that the reference point Pbk determined in advance in the work device 1A is along the target surface St and does not cross the target surface St. Further, the controller 140 computes the command pilot pressure Pi2 on the basis of the operation pilot pressure Pi0 and the target pilot pressure Pi1.

The controller 140 computes the gravitational direction component VG of the action direction vector VD of the driving target members (8 to 10) on the basis of the posture information sensed by the posture sensor 50. The controller 140 corrects the target pilot pressure Pi1 on the basis of the gravitational direction component VG of the action direction vector VD when the target pilot pressure Pi1 exceeds a predetermined pressure (actuator non-driving corresponding pressure) ps. The controller 140 corrects the operation pilot pressure Pi0 when the operation pilot pressure Pi0 exceeds the predetermined pressure (actuator non-driving corresponding pressure) ps. The controller 140 computes the command pilot pressure Pi2 on the basis of the target pilot pressure Pi1' after the correction and the operation pilot pressure Pi0' after the correction. The controller 140 outputs, to the plurality of solenoid valves 54*a* to 56*b*, the control signal corresponding to the command pilot pressure Pi2 that is computed according to the gravitational direction component VG of the action direction vector VD of the driving target members (8 to 10) and in which the correction is incorporated.

According to this configuration, an improvement in work accuracy can be achieved by uniformizing variations in the delay time which variations are caused by an effect of gravity acting on the work device 1A.

(2) In the present embodiment, supposing that the gravitational direction component VG of the action direction vector VD in an opposite direction (vertically upward direction) from the direction of gravity is a positive value, and supposing that the gravitational direction component VG of the action direction vector VD in the direction of gravity (vertically downward direction) is a negative value, the controller 140 corrects the target pilot pressure Pi1 as the command value of the pilot pressure to a higher value as the gravitational direction component VG of the action direction vector VD is increased. In the present embodiment, the controller 140 raises the corrected pressure Pmax1 as the gravitational direction component VG of the action direction vector VD is increased.

When the driving target members (8 to 10) are actuated in the opposite direction from the gravitational direction, the controller 140 raises the corrected pressure Pmax1 as a maximum value of the target pilot pressure Pi1' after the correction as compared with a case where the driving target members (8 to 10) are actuated in the gravitational direction. It is thereby possible to reduce the delay time in a case where the driving target members (8 to 10) are actuated in the opposite direction from the gravitational direction. In addition, when the driving target members (8 to 10) are actuated in the gravitational direction, the corrected pressure Pmax1 as a maximum value of the target pilot pressure Pi1' after the correction is decreased as compared with the case where the driving target members (8 to 10) are actuated in the opposite direction from the gravitational direction. It is thereby possible to prevent the delay time in the case where the driving target members (8 to 10) are actuated in the gravitational direction from becoming excessively small. Hence, the delay time in the case where the driving target members (8 to 10) are actuated in the opposite direction from the gravitational direction and the delay time in the case where the driving target members (8 to 10) are actuated in the gravitational direction can be made similar to each other. That is, the delay time can be made uniform irrespective of the posture and the action direction of the driving target members (8 to 10). As a result, the work device 1A can be actuated with high accuracy.

(3) The controller 140 sets, as the operation pilot pressure Pi0' after the correction, a predetermined corrected pressure (maximum value of the operation pilot pressure Pi0' after the correction in the present embodiment) Pmax0 higher than the operation pilot pressure Pi0 before the correction when the operation pilot pressure Pi0 before the correction exceeds the actuator non-driving corresponding pressure ps, and the controller 140 computes the operation pilot pressure Pi0' after the correction such that the operation pilot pressure Pi0' after the correction gradually approaches the operation pilot pressure Pi0 before the correction as the elapsed time Ta increases. It is thereby possible to reduce the delay time from the application of control currents corresponding to the operation of the operation devices A1 to A3 to the solenoid valves 54*a* to 56*b* to the driving of the hydraulic cylinders (5 to 7) at a time of a start of a manual operation. Further, the pilot pressure generated by the solenoid valves 54*a* to 56*b* can be made to promptly follow the operation pilot pressure Pi0 corresponding to the operation of the operation devices A1 to A3. As a result, an operation feeling at a time of the manual operation is improved, and work efficiency can be improved. Incidentally, as described above, when the corrected pressure Pmax0 is set for each of the driving target members (8 to 10), the operation feeling can be improved as compared with a case where the corrected pressure Pmax0 is made to be the same for the driving target members (8 to 10).

(4) The controller 140 sets, as the target pilot pressure Pi1' after the correction, a predetermined corrected pressure (maximum value of the target pilot pressure Pi1' after the correction in the present embodiment) Pmax1 higher than the target pilot pressure Pi1 before the correction when the target pilot pressure Pi1 before the correction exceeds the actuator non-driving corresponding pressure ps, and the controller 140 computes the target pilot pressure Pi1' after the correction such that the target pilot pressure Pi1' after the correction gradually approaches the target pilot pressure Pi1 before the correction as the elapsed time τb increases. It is thereby possible to reduce the delay time from the application of control currents corresponding to commands of the controller 140 to the solenoid valves 54*a* to 56*b* to the driving of the hydraulic cylinders (5 to 7) at a time of a start of a semi-automatic operation. Further, the pilot pressure generated by the solenoid valves 54*a* to 56*b* can be made to promptly follow the target pilot pressure Pi1 computed so as to be along the target surface St. As a result, responsiveness of the hydraulic cylinders (5 to 7) at a time of a start of driving the work device 1A by the semi-automatic operation is improved. Incidentally, as described above, when the corrected pressure table (see FIG. 11) used for computing the corrected pressure Pmax1 is set for each of the driving target members (8 to 10), the delay time can be made uniform as compared with a case where the corrected pressure table is made to be the same for the driving target members (8 to 10). As a result, the work device 1A can be actuated with higher accuracy, and thus an accuracy of processing of an excavation surface can be improved.

(5) The hydraulic excavator 1 includes: the position sensor 52 that senses the positional information of the machine body 1B; and the operation devices A1 to A3 for operating the work device 1A. The controller 140 obtains the target shape data, and sets the target surface St on the basis of the obtained target shape data, the positional information of the machine body 1B, and the posture information of the work device 1A. The controller 140 computes the operation pilot pressure Pi0 so as to be along the target surface St on the basis of the operation amounts of the operation devices A1 to A3. The controller 140 computes the target pilot pressure Pi1 such that the reference point Pbk determined in advance in the work device 1A is along the target surface St and does not cross the target surface St. The controller 140 computes the control intervention ratio a that is increased as the distance (target surface distance) H from the reference point Pbk of the work device 1A to the target surface St is decreased. The controller 140 computes the command pilot pressure Pi2 on the basis of the operation pilot pressure Pi0, the target pilot pressure Pi1, and the control intervention ratio a, and outputs a control signal corresponding to the command pilot pressure Pi2 to the solenoid valves 54*a* to 56*b*. The controller 140 corrects the target pilot pressure Pi1 on the basis of the gravitational direction component VG of the action direction vector VD when the target pilot pressure Pi1 exceeds the actuator non-driving corresponding pressure ps and reaches the actuator driving corresponding pressure.

As indicated by Equation (3), the higher the control intervention ratio a, the larger the degree of effect produced on the command pilot pressure Pi2 by the corrected target pilot pressure Pi1'. Consequently, an abrupt change in the command pilot pressure Pi2 is prevented when a state transition occurs between a semi-automatic operation (operation under the intervening control) state and a manual operation state. As a result, an operation state transition is made smoothly without causing a shock.

SECOND EMBODIMENT

A hydraulic excavator 1 according to a second embodiment of the present invention will be described with reference to FIGS. 12 to 15. Incidentally, configurations identical to or corresponding to configurations described in the first embodiment are identified by the same reference numerals, and description will be made mainly of differences.

The hydraulic excavator 1 according to the second embodiment has a configuration similar to that of the hydraulic excavator 1 according to the first embodiment (see FIG. 4, FIG. 6, and the like). The hydraulic excavator 1 according to the first embodiment computes the command pilot pressure Pi2 on the basis of the corrected operation pilot pressure Pi0', the corrected target pilot pressure Pi1', and the control intervention ratio a (see Equation (3)). On the other hand, even when the target surface distance H is less than the second distance H2, the hydraulic excavator 1 according to the second embodiment sets the corrected operation pilot pressure Pi0' as the command pilot pressure Pi2 in a case where the driving target members (8 to 10) are actuated so as to separate from the target surface St.

The controller 140 of the hydraulic excavator 1 according to the second embodiment computes angles φBmU, φBmD, φAmC, φAmD, φBkC, and φBkD of the action direction vectors VBmU, VBmD, VAmC, VAmD, VBkC, and VBkD of the driving target members (the boom 8, the arm 9, and the bucket 10) with respect to the target surface St. In the following, the angles φBmU, φBmD, φAmC, φAmD, φBkC, and φBkD will be collectively described also as an angle cp.

When the driving target members (8 to 10) are operated by the operation devices A1 to A3, the controller 140 determines whether or not the operation on the driving target members (8 to 10) is an operation in a direction of invading the target surface St, that is, an operation in a direction of approaching the target surface St on the basis of the angle φ of the action direction vector VD of the operated driving target members (8 to 10) and the control intervention ratio a.

When the controller 140 determines that the operation on the driving target members (8 to 10) is not an operation in the direction of invading the target surface St, the controller 140 computes the command pilot pressure (first command pilot pressure) Pi2 on the basis of the operation pilot pressure Pi0, and outputs a control signal corresponding to the command pilot pressure (first command pilot pressure) Pi2 to the solenoid valves 54*a* to 56*b*.

When the controller 140 determines that the operation on the driving target members (8 to 10) is an operation in the direction of invading the target surface St, the controller 140 computes the command pilot pressure (second command pilot pressure) Pi2 on the basis of the operation pilot pressure Pi0, the target pilot pressure Pi1, and the control intervention ratio a, and outputs a control signal corresponding to the command pilot pressure (second command pilot pressure) Pi2 to the solenoid valves 54*a* to 56*b*.

Figure 12:
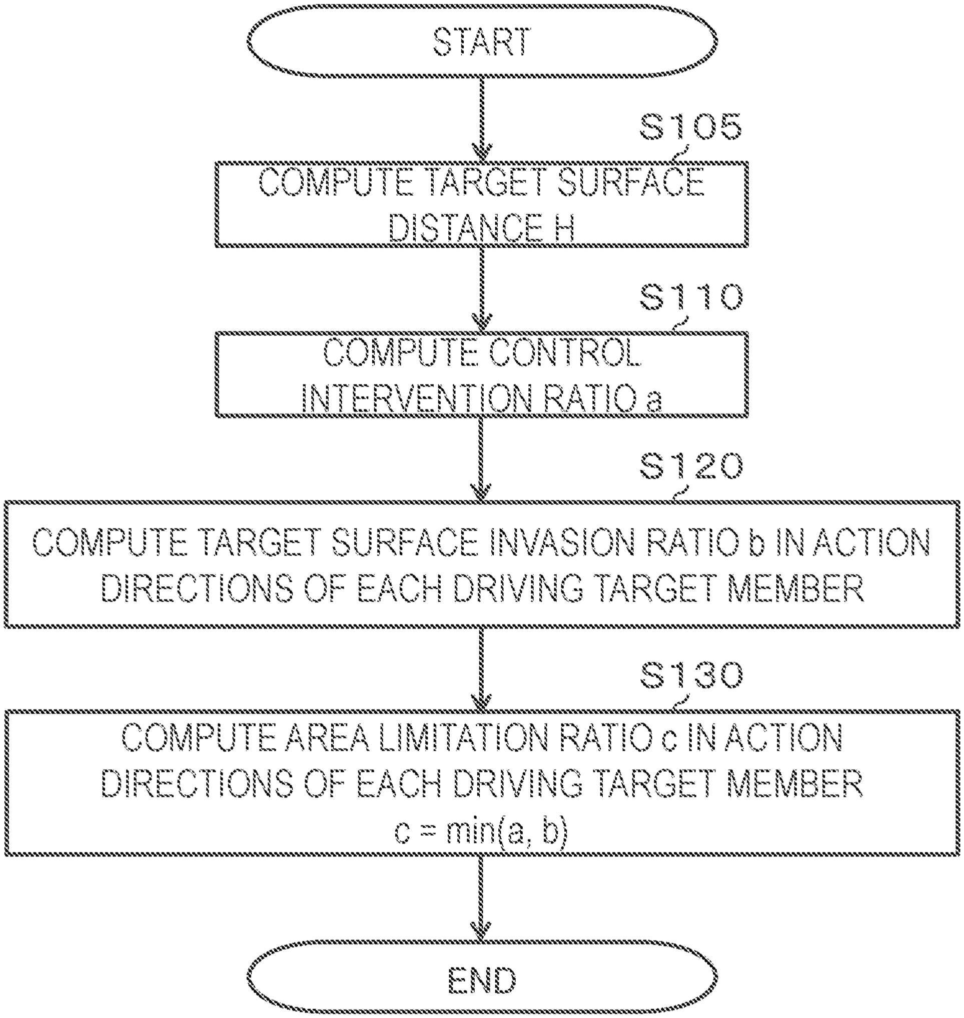
FIG. 12 is a flowchart showing a flow from processing of computing the target surface distance H to processing of computing an area limitation ratio c, the processing being performed by a controller according to a second embodiment of the present invention.
Figure 13:
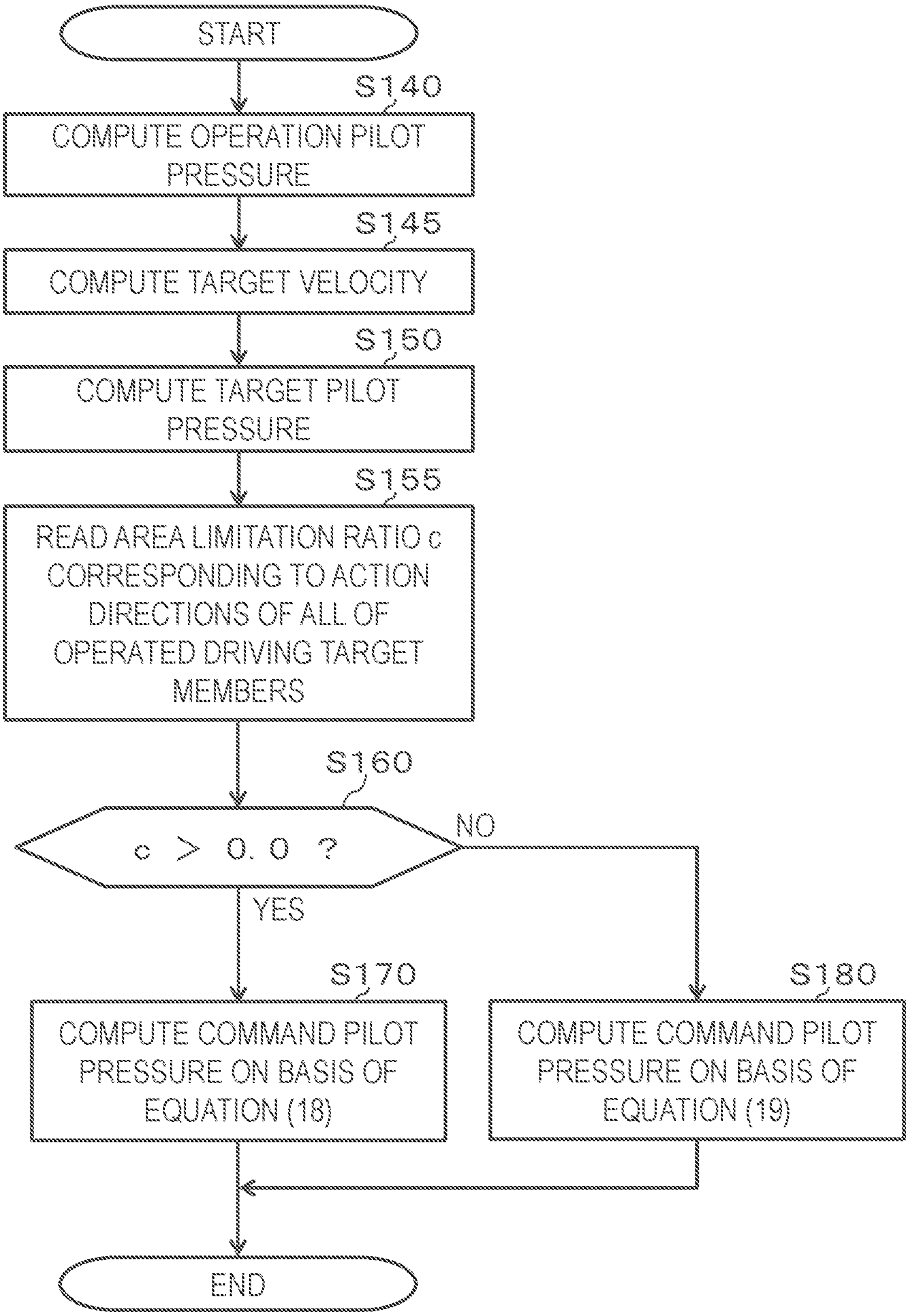
FIG. 13 is a flowchart showing the contents of processing of computing a command pilot pressure in which action directions of the driving target members are taken into consideration.

In the following, the contents of processing performed by the controller 140 according to the second embodiment will be described in detail with reference to FIG. 12 and FIG. 13. FIG. 12 is a flowchart showing a flow from processing of computing the target surface distance H to processing of computing an area limitation ratio c. FIG. 13 is a flowchart showing the contents of processing of computing the command pilot pressure in which the action directions of the driving target members are taken into consideration. The processing of the flowcharts shown in FIG. 12 and FIG. 13 is, for example, started by turning on an ignition switch not shown, and is repeatedly performed in predetermined control cycles after an initial setting not shown is made.

As shown in FIG. 12, in step S105, the posture computing section 142 computes the position coordinates of the reference point Pbk of the bucket 10 on the basis of posture information. Further, the posture computing section 142 computes the target surface distance H as a distance between the target surface St computed by the target surface setting section 143 and the reference point Pbk of the bucket 10. The processing then proceeds to step 110.

In step S110, the command pilot pressure correcting section 146 refers to the ratio computation table (see FIG. 8) stored in the nonvolatile memory 93, and computes the control intervention ratio a on the basis of the target surface distance H computed in step S105. The processing then proceeds to step S120.

In step S120, the command pilot pressure correcting section 146 first computes the angles φBmU, φBmD, φAmC, φAmD, φBkC, and φBkD of the action direction vectors VBmU, VBmD, VAmC, VAmD, VBkC, and VBkD of the driving target members (8 to 10) with respect to the target surface St.

Figure 14A:
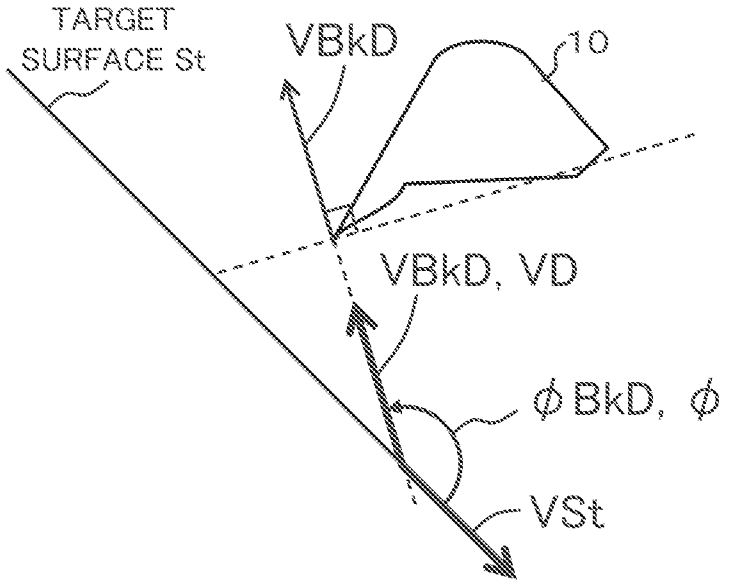
FIG. 14A is a diagram showing an angle φBkD of an action direction vector VBkD of the bucket with respect to a target surface St at a time of a bucket dumping operation.
Figure 14B:
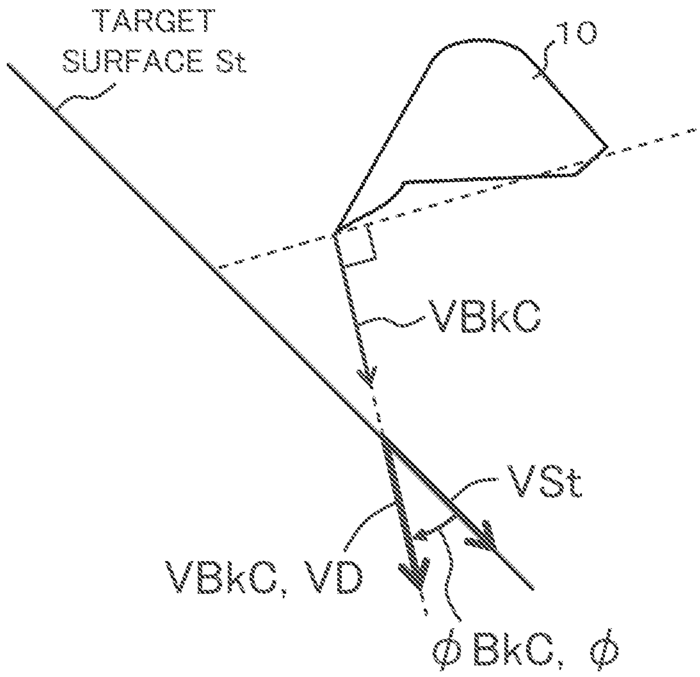
FIG. 14B is a diagram showing an angle φBkC of an action direction vector VBkC of the bucket with respect to the target surface St at a time of a bucket crowding operation.

An example of the angle φ of the action direction vector VD of the driving target members with respect to the target surface St will be described with reference to FIG. 14A and FIG. 14B. FIG. 14A is a diagram showing the angle φBkD of the action direction vector VBkD of the bucket 10 with respect to the target surface St at a time of a bucket dumping operation. FIG. 14B is a diagram showing the angle φBkC of the action direction vector VBkC of the bucket 10 with respect to the target surface St at a time of a bucket crowding operation.

As shown in FIG. 14A and FIG. 14B, the angle φ corresponds to an angle formed between the action direction vector VD and a target surface vector Vst, that is, an angle obtained from an inner product of the action direction vector VD and the target surface vector Vst. The target surface vector Vst is a unit vector oriented in parallel with the target surface St and in a direction toward the hydraulic excavator 1. With the target surface vector Vst as a reference, an angle in a counterclockwise direction shown in the figure from the target surface vector Vst to the action direction vector VD is represented by a positive value. With the target surface vector Vst as a reference, an angle in a clockwise direction shown in the figure from the target surface vector Vst to the action direction vector VD is represented by a negative value.

The angles φBmU, φBmD, φAmC, φAmD, φBkC, and φBkD formed between the action direction vectors VBmU, VBmD, VAmC, VAmD, VBkC, and VBkD and the target surface vector Vst are angles represented by values within a range equal to or more than −180° and equal to or less than 180° among angles formed between the two vectors VD and Vst when a starting point of the action direction vector VD and a starting point of the target surface vector Vst are superposed on each other. In the example shown in FIG. 14A, the angle φBkD formed between the action direction vector VBkD of the bucket 10 and the target surface vector Vst at the time of the bucket dumping operation is approximately 150°. In the example shown in FIG. 14B, the angle φBkC formed between the action direction vector VBkC of the bucket 10 and the target surface vector Vst at the time of the bucket crowding operation is approximately −30°.

The command pilot pressure correcting section 146 computes the angle φ from the inner product of the action direction vector VD and the target surface vector Vst. The command pilot pressure correcting section 146 computes target surface invasion ratios φBmU, φBmD, φAmC, φAmD, φBkC, and φBkD on the basis of the angles φBmU, φBmD, φAmC, φAmD, φBkC, and φBkD. In the following, the target surface invasion ratios φBmU, φBmD, φAmC, φAmD, φBkC, and φBkD will be collectively described also as a target surface invasion ratio b.

Figure 15:
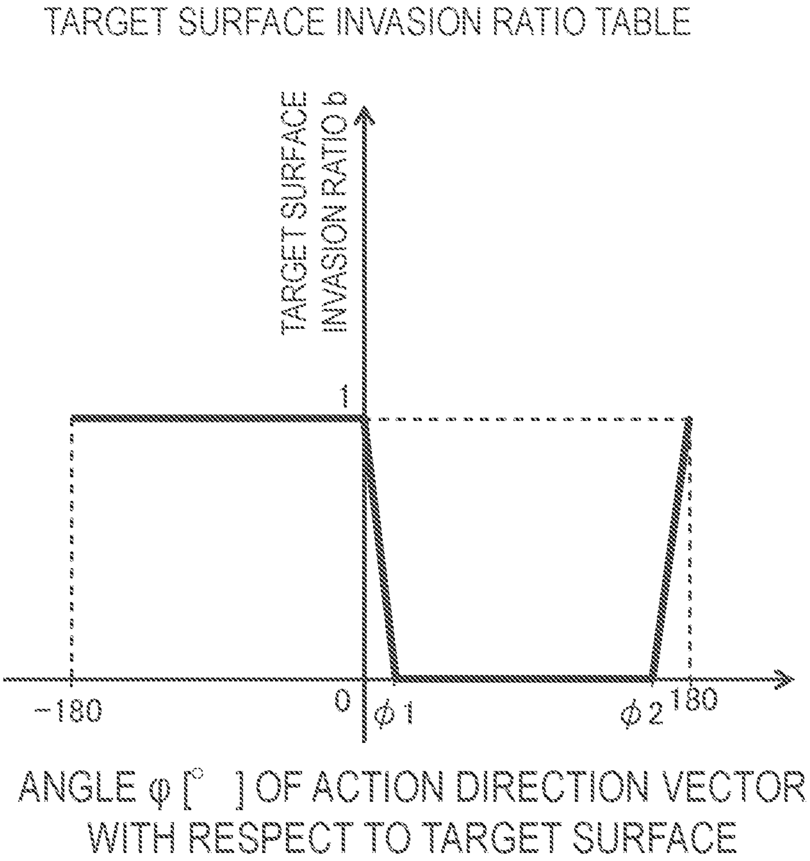
FIG. 15 is a diagram showing relation between an angle φ of an action direction vector VD with respect to the target surface St and a target surface invasion ratio b.

FIG. 15 is a diagram showing relation between the angle φ of the action direction vector VD with respect to the target surface St and the target surface invasion ratio b. In FIG. 15, an axis of abscissas indicates the angle φ of the action direction vector VD with respect to the target surface St, and an axis of ordinates indicates the target surface invasion ratio b. The target surface invasion ratio b is a parameter indicating the action directions of the driving target members (8 to 10) with respect to the target surface St. The target surface invasion ratio b is used to determine whether or not the operation on the driving target members (8 to 10) is an operation in the direction of invading the target surface St. The relation between the target surface invasion ratio b and the angle φ which relation is shown in FIG. 15 is stored in a table format in the nonvolatile memory 93 in advance.

As shown in FIG. 15, when the angle φ is equal to or more than −180° and equal to or less than 0°, the target surface invasion ratio b is 1. That is, the target surface invasion ratio b is 1 when the driving target members (8 to 10) of the work device 1A are operated in the direction of approaching the target surface St (the direction of invading the target surface St). In other words, when the driving target members (8 to 10) are operated in a direction of moving away from the target surface St (direction of not invading the target surface St), the target surface invasion ratio b is a value less than 1. In a range in which the angle φ is larger than 0° and less than φ1, the target surface invasion ratio b is decreased as the angle φ is increased. In a range in which the angle φ is equal to or more than φ1 and equal to or less than φ2, the target surface invasion ratio b is 0. In a range in which the angle φ is larger than φ2 and equal to or less than 180°, the target surface invasion ratio b is increased as the angle φ is increased.

φ1 is a value of approximately 10° to 20°, for example. φ2 is a value of approximately 160° to 170°, for example. Here, when the target surface invasion ratio b is 0° in a range equal to or more than 0° and equal to or less than 180°, the bucket 10 may unintentionally come into contact with the target surface St due to an effect of an error or the like in actions of the driving target members according to operations of the operation devices A1 to A3, as will be described later. On the other hand, in the present embodiment, a target surface invasion ratio table is defined such that the target surface invasion ratio b is 0 in a range equal to or more than φ1, which is larger than 0°, and equal to or less than φ2, which is smaller than 180°. Therefore, the bucket 10 can be prevented from unintentionally coming into contact with the target surface St.

In step S120 shown in FIG. 12, the command pilot pressure correcting section 146 refers to the target surface invasion ratio table shown in FIG. 15, and computes the target surface invasion ratio b on the basis of each of the angles φBmU, φBmD, φAmC, φAmD, φBkC, and φBkD. The processing then proceeds to step S130.

In step S130, the command pilot pressure correcting section 146 sets, as an area limitation ratio c, a selected smaller one of the control intervention ratio a computed in step S110 and the target surface invasion ratio b computed in step S120. That is, the command pilot pressure correcting section 146 computes area limitation ratios cBmU, cBmD, cAmC, cAmD, cBkC, and cBkD by comparing each of the target surface invasion ratios bBmU, bBmD, bAmC, bAmD, bBkC, and bBkD with the control intervention ratio a, and selecting a minimum value. In the following, a method of computing the area limitation ratios cBmU, cBmD, cAmC, cAmD, cBkC, and cBkD will be described concretely.

The command pilot pressure correcting section 146 computes the area limitation ratio cBmU by selecting a minimum value of the target surface invasion ratio φBmU obtained from the action direction vector VBmU of the boom 8 where a boom raising operation is assumed and the control intervention ratio a on the basis of the following Equation (12). The command pilot pressure correcting section 146 computes the area limitation ratio cBmD by selecting a minimum value of the target surface invasion ratio φBmD obtained from the action direction vector VBmD of the boom 8 where a boom lowering operation is assumed and the control intervention ratio a on the basis of the following Equation (13). The command pilot pressure correcting section 146 computes the area limitation ratio cAmC by selecting a minimum value of the target surface invasion ratio φAmC obtained from the action direction vector VAmC of the arm 9 where an arm crowding operation is assumed and the control intervention ratio a on the basis of the following Equation (14). The command pilot pressure correcting section 146 computes the area limitation ratio cAmD by selecting a minimum value of the target surface invasion ratio bAmD obtained from the action direction vector VAmD of the arm 9 where an arm dumping operation is assumed and the control intervention ratio a on the basis of the following Equation (15). The command pilot pressure correcting section 146 computes the area limitation ratio cBkC by selecting a minimum value of the target surface invasion ratio φBkC obtained from the action direction vector VBkC of the bucket 10 where a bucket crowding operation is assumed and the control intervention ratio a on the basis of the following Equation (16). The command pilot pressure correcting section 146 computes the area limitation ratio cBkD by selecting a minimum value of the target surface invasion ratio φBkD obtained from the action direction vector VBkD of the bucket 10 where a bucket dumping operation is assumed and the control intervention ratio a on the basis of the following Equation (17).

$$cBmU=\min(a,bBmU) \quad (12)$$

$$cBmD=\min(a,bBmD) \quad (13)$$

$$cAmC=\min(a,bAmC) \quad (14)$$

$$cAmD=\min(a,bAmD) \quad (15)$$

$$cBkC=\min(a,bBkC) \quad (16)$$

$$cBkD=\min(a,bBkD) \quad (17)$$

In the following, the area limitation ratios cBmU, cBmD, cAmC, cAmD, cBkC, and cBkD will be collectively described also as the area limitation ratio c.

The area limitation ratio c is 1.0 when the target surface distance H is equal to or less than the first distance H1 (for example, 300 mm) and the angle φ of the action direction vector VD of the driving target members (8 to 10) is equal to or more than −180° and equal to or less than 0°. The area limitation ratio c is a value smaller than 1.0 when the target surface distance H is larger than the first distance H1 (for example, 300 mm) or when the angle φ of the action direction vector VD of the driving target members (8 to 10) is larger than 0° and equal to or less than 180°. The area limitation ratio c is 0.0 when the target surface distance H is equal to or more than the second distance H2 (for example, 1000 mm) or when the angle φ of the action direction vector VD of the driving target members (8 to 10) is equal to or more than φ1 and equal to or less than φ2.

When the processing of computing the area limitation ratios cBmU, cBmD, cAmC, cAmD, cBkC, and cBkD is completed in step S130, the processing shown in the flowchart of FIG. 12 is ended. That is, the processing proceeds to step S105 in a next control cycle (computation cycle). The controller 140 thus repeatedly computes the area limitation ratios cBmU, cBmD, cAmC, cAmD, cBkC, and cBkD in predetermined control cycles. Incidentally, the computed area limitation ratios cBmU, cBmD, cAmC, cAmD, cBkC, and cBkD are stored in the volatile memory 94 as a storage device.

As shown in FIG. 13, in step S140, the operation amount computing section 141 computes the operation pilot pressure Pi0 on the basis of the operation directions and operation amounts of the operation devices A1 to A3. The processing then proceeds to step S145. In step S145, the target velocity computing section 144 computes the target velocity of each hydraulic cylinder (5, 6, 7) on the basis of a computation result in the posture computing section 142 and a computation result in the operation amount computing section 141. The processing then proceeds to step S150. In step S150, the target pilot pressure computing section 145 computes the target pilot pressure Pi1 on the basis of the target velocity computed in step S145. The processing then proceeds to step S155.

In step S155, the command pilot pressure correcting section 146 reads the area limitation ratio c corresponding to the action directions of all of the operated driving target members from the volatile memory 94 on the basis of the computation result in the operation amount computing section 141. The processing then proceeds to step S160. When an arm crowding operation is performed, for example, the command pilot pressure correcting section 146 reads the area limitation ratio cAmC from the volatile memory 94. In addition, when an arm dumping operation is performed, the command pilot pressure correcting section 146 reads the area limitation ratio cAmD from the volatile memory 94.

In step S160, the command pilot pressure correcting section 146 determines whether or not an operation on the driving target members (8 to 10) is an operation in the direction of invading the target surface St on the basis of the area limitation ratio c read from the volatile memory 94 in step S155. Here, the operation in the direction of invading the target surface St refers to an operation that would cause the reference point Pbk of the bucket 10 to penetrate the target surface St if the operation were continued and the intervening control were not performed. In addition, the operation that invades the target surface St can also be said to be an operation such that the reference point Pbk of the bucket 10 approaches the target surface St.

Specifically, the command pilot pressure correcting section 146 determines whether or not the area limitation ratio c is larger than 0.0. In step S160, when the area limitation ratio c is larger than 0.0, the command pilot pressure correcting section 146 determines that the operation on the driving target members (8 to 10) is an operation in the direction of invading the target surface St. The processing then proceeds to step S170. In step S160, when the command pilot pressure correcting section 146 determines that the area limitation ratio c is equal to or less than 0.0 (that is, when c=0), the command pilot pressure correcting section 146 determines that the operation on the driving target members (8 to 10) is not an operation in the direction of penetrating the target surface St. The processing then proceeds to step S180.

In step S170, the command pilot pressure correcting section 146 computes the command pilot pressure Pi2 on the basis of the following Equation (18). The processing shown in the flowchart of FIG. 13 is then ended.

$$Pi2=Pi0'\times(1-a)+Pi1'\times a \quad (18)$$

Incidentally, Equation (18) is the same equation as Equation (3) described above. The corrected operation pilot pressure Pi0' is computed by Equation (4) on the basis of the corrected pressure Pmax0 and the operation pilot pressure Pi0. The corrected target pilot pressure Pi1' is computed by Equation (5) on the basis of the corrected pressure Pmax1 and the target pilot pressure Pi1.

In step S180, the command pilot pressure correcting section 146 computes the command pilot pressure Pi2 on the basis of the following Equation (19). The processing shown in flowchart of FIG. 13 is then ended.

$$Pi2=Pi0' \quad (19)$$

That is, the command pilot pressure Pi2 becomes the corrected operation pilot pressure Pi0'.

-Effects-

As described above, when the controller 140 according to the present second embodiment determines that the operation on the driving target members (8 to 10) is not an operation in a direction of approaching the target surface St (direction of invading the target surface St) (No in step S160 in FIG. 13), the controller 140 performs manual control that computes the command pilot pressure (first command pilot pressure) Pi2 on the basis of the operation pilot pressure Pi0 (step S180 in FIG. 13), and outputs a control signal corresponding to the command pilot pressure (first command pilot pressure) Pi2 to the solenoid valves 54*a* to 56*b*. When the controller 140 determines that the operation on the driving target members (8 to 10) is an operation in the direction of approaching the target surface St (direction of invading the target surface St) (Yes in step S160 in FIG. 13), the controller 140 performs the intervening control that computes the command pilot pressure (second command pilot pressure) Pi2 on the basis of the operation pilot pressure Pi0, the target pilot pressure Pi1, and the control intervention ratio a (step S170 in FIG. 13), and outputs a control signal corresponding to the command pilot pressure (second command pilot pressure) Pi2 to the solenoid valves 54*a* to 56*b*.

The present second embodiment produces the following actions and effects in addition to actions and effects similar to those of the first embodiment.

(6) When the operation on the operation devices A1 to A3 is not an operation in the direction of invading the target surface St, the corrected operation pilot pressure Pi0' is computed as the command pilot pressure (first command pilot pressure) Pi2. Hence, even in a case where the ground leveling control mode is set, and the reference point Pbk of the bucket 10 is close to the target surface St, the work device 1A are actuated as intended by the operator when the driving target members (8 to 10) are operated such that the reference point Pbk of the bucket 10 separates from the target surface St. It is thereby possible to improve work efficiency without causing a feeling of strangeness to the operator.

(7) The target surface invasion ratio b is computed on the basis of the angles φBmU, φBmD, φAmC, φAmD, φBkC, and φBkD formed between the action direction vectors VBmU, VBmD, VAmC, VAmD, VBkC, and VBkD of the respective driving target members (8 to 10) and the target surface vector Vst. The area limitation ratio c is computed on the basis of the control intervention ratio a and the target surface invasion ratio b, and is used to determine whether to perform the manual control using Equation (19) or perform the intervening control using Equation (18). The area limitation ratio c is computed before a start of operation of the operator (see FIG. 12). Therefore, pilot pressure arbitration at a time point of the start of the operation can be performed easily. It is consequently possible to prevent the occurrence of a shock caused by switching between the intervening control and the manual control.

THIRD EMBODIMENT

Figure 16:
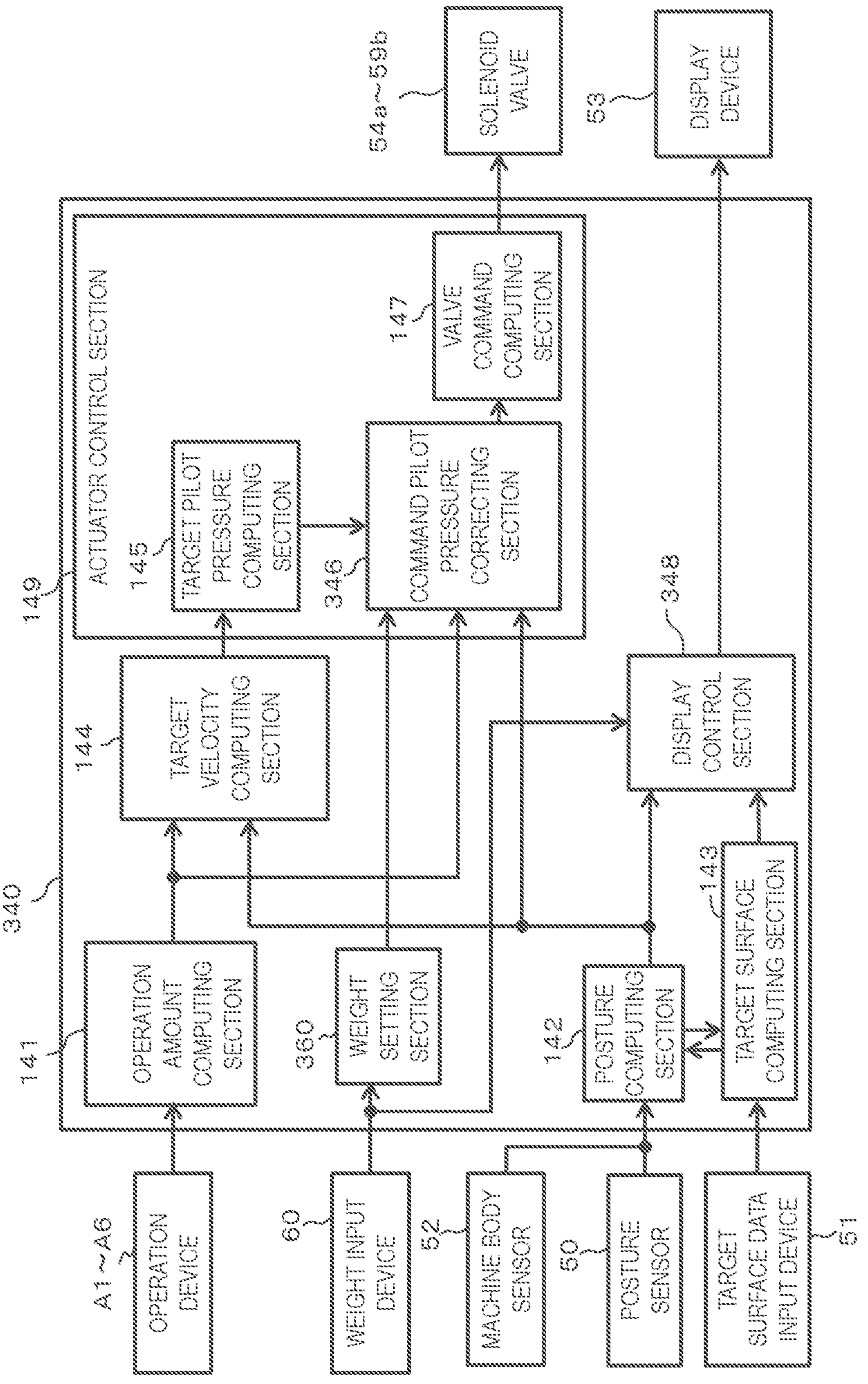
FIG. 16 is a functional block diagram of a controller according to a third embodiment of the present invention.

A hydraulic excavator 1 according to a third embodiment of the present invention will be described with reference to FIG. 16 and FIG. 17. Incidentally, configurations identical to or corresponding to configurations described in the first embodiment are identified by the same reference numerals, and description will be made mainly of differences. FIG. 16 is a functional block diagram of a controller 340 according to the third embodiment.

As shown in FIG. 16, the hydraulic excavator 1 according to the third embodiment includes a weight input device 60 that inputs weight information of the driving target members (8 to 10) to the controller 340 in addition to configurations similar to those of the hydraulic excavator 1 described in the first embodiment. The weight input device 60 includes, for example, a plurality of switches, a stick operating member, and the like operated by the operator. Incidentally, the weight input device 60 may be a touch sensor provided on the display screen of the display device 53. By operating the weight input device 60, the operator can input the weight information of the driving target members (8 to 10) to the controller 340.

The controller 340 has a function as a weight setting section 360 in addition to the functions described in the first embodiment. When an operation of starting the input of a weight by the weight input device 60 is performed, a display control section 348 displays a screen for selecting a kind of bucket 10 on the display device 53. The nonvolatile memory 93 stores, in advance, kinds of a plurality of buckets 10 and weights associated with the kinds of the respective buckets 10. The nonvolatile memory 93 stores, in advance, kinds of a plurality of arms 9 and weights associated with the kinds of the respective arms 9. The nonvolatile memory 93 stores, in advance, kinds of a plurality of booms 8 and weights associated with the kinds of the respective booms 8.

When the operator performs an operation of selecting a kind of bucket 10, the weight input device 60 inputs the selected kind of bucket 10 as weight information to the controller 340. The weight setting section 360 refers to the nonvolatile memory 93, and sets a weight associated with the selected kind of bucket 10 as the weight of the bucket 10 currently attached to the hydraulic excavator 1 (which weight will hereinafter be referred to as a first set weight).

When the operator performs an operation of selecting a kind of arm 9, the weight input device 60 inputs the selected kind of arm 9 as weight information to the controller 340. The weight setting section 360 refers to the nonvolatile memory 93, and sets a weight associated with the selected kind of arm 9 as the weight of the arm 9 currently attached to the hydraulic excavator 1. Further, the weight setting section 360 sets, as a second set weight, a weight obtained by adding the first set weight to the set weight of the arm 9.

When the operator performs an operation of selecting a kind of boom 8, the weight input device 60 inputs the selected kind of boom 8 as weight information to the controller 340. The weight setting section 360 refers to the nonvolatile memory 93, and sets a weight associated with the selected kind of boom 8 as the weight of the boom 8 currently attached to the hydraulic excavator 1. Further, the weight setting section 360 sets, as a third set weight, a weight obtained by adding the second set weight to the set weight of the boom 8.

A command pilot pressure correcting section 346 computes a first to a third correction coefficient for correcting the gravitational direction component VG of the action direction vector VD of the driving target members (8 to 10) on the basis of the first to third set weights set by the weight setting section 360. In the following, the first to third set weights will be collectively described as a set weight, and the first to third correction coefficients will be collectively described as a correction coefficient.

Figure 17:
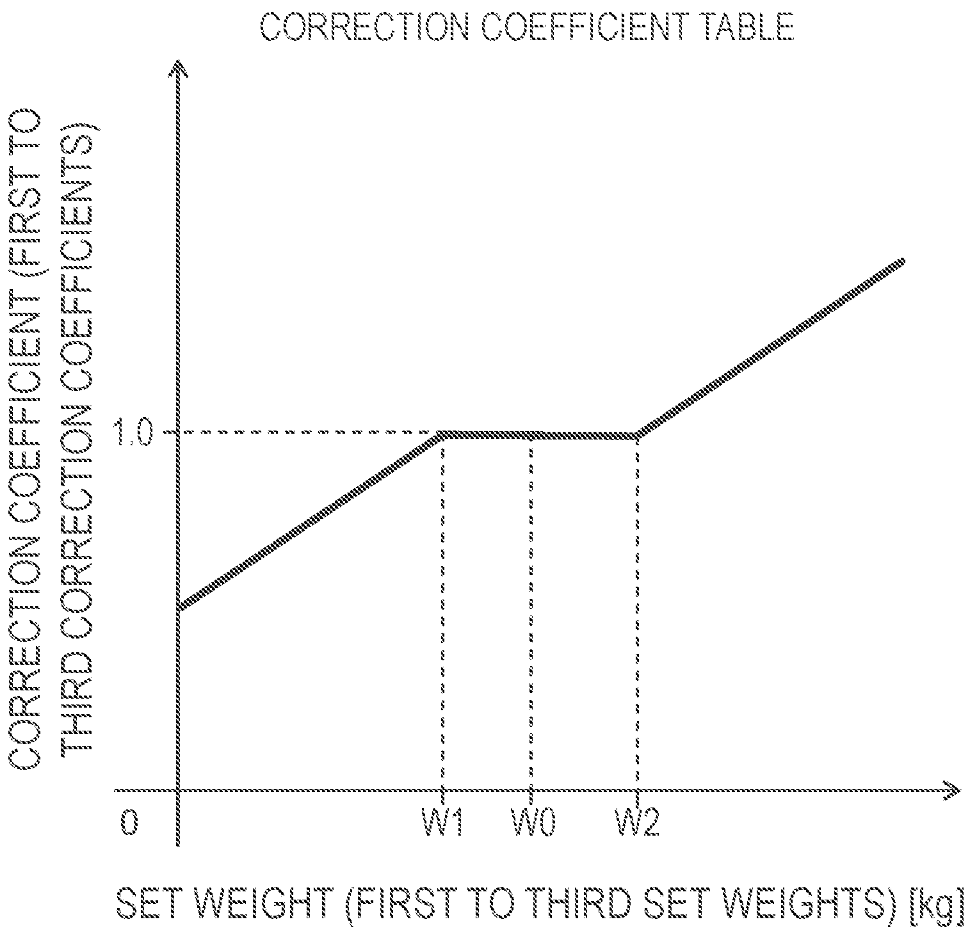
FIG. 17 is a diagram showing a correction coefficient table.

Referring to FIG. 17, description will be made of a method of computing the correction coefficient for correcting the gravitational direction component VG of the action direction vector VD of the driving target members (8 to 10). FIG. 17 is a diagram showing a correction coefficient table. The correction coefficient table is a data table in which the correction coefficient with respect to the set weight is defined. The nonvolatile memory 93 stores a first correction coefficient table defining relation between the first set weight and the first correction coefficient, a second correction coefficient table defining relation between the second set weight and the second correction coefficient, and a third correction coefficient table defining relation between the third set weight and the third correction coefficient.

The command pilot pressure correcting section 346 refers to the first correction coefficient table, and computes the first correction coefficient on the basis of the first set weight. The command pilot pressure correcting section 346 refers to the second correction coefficient table, and computes the second correction coefficient on the basis of the second set weight. The command pilot pressure correcting section 346 refers to the third correction coefficient table, and computes the third correction coefficient on the basis of the third set weight.

As shown in FIG. 17, the correction coefficient is 1.0 when the set weight is equal to or more than a first weight W1 and equal to or less than a second weight W2. When the set weight is less than the first weight W1, the correction coefficient is decreased as the set weight is decreased. That is, when the set weight is less than the first weight W1, the correction coefficient is less than 1.0. When the set weight is larger than the second weight W2, the correction coefficient is increased as the set weight is increased. That is, when the set weight is larger than the second weight W2, the correction coefficient is a value larger than 1.0.

In the present embodiment, the weight of a specific kind (frequently used kind) of driving target member (8 to 10) is set as a reference weight W0, and a value obtained by subtracting a predetermined weight from the reference weight W0 is set as the first weight W1. In addition, a value obtained by adding a predetermined weight to the reference weight W0 is set as the second weight W2. Incidentally, the reference weight W0 in the first correction coefficient table is the weight of a specific kind of bucket 10. The reference weight W0 in the second correction coefficient table is a total weight obtained by adding together the weight of the specific kind of bucket 10 and the weight of a specific kind of arm 9. The reference weight W0 in the third correction coefficient table is a total weight obtained by adding together the weight of the specific kind of bucket 10, the weight of the specific kind of arm 9, and the weight of a specific kind of boom 8.

As in the first embodiment, the command pilot pressure correcting section 346 computes the gravitational direction component VG of the action direction vector VD on the basis of the posture information of the work device 1A and the posture information of the swing structure 12. The command pilot pressure correcting section 346 multiplies each of the gravitational direction components VGBmU, VGBmD, VGAmC, VGAmD, VGBkC, and VGBkD of the action direction vector VD of the driving target members (8 to 10) by the correction coefficient obtained from the weights of the driving target members (8 to 10). The command pilot pressure correcting section 346 thereby computes gravitational direction components VGBmU', VGBmD', VGAmC', VGAmD', VGBkC', and VGBkD' after correction. The command pilot pressure correcting section 346 refers to the corrected pressure table shown in FIG. 11, and computes the corrected pressure Pmax1 on the basis of the gravitational direction components VGBmU', VGBmD', VGAmC', VGAmD', VGBkC', and VGBkD' after the correction.

In the first embodiment, the gravitational direction components are values in a range equal to or more than −1 and equal to or less than 1. In the present third embodiment, on the other hand, the gravitational direction components after the correction may be smaller than −1 and may be larger than 1.

-Effects-

As described above, the controller 340 according to the present third embodiment sets the weights of the driving target members (8 to 10) on the basis of the weight information input from the weight input device 60 as an external device. The controller 340 corrects the gravitational direction component VG of the action direction vector VD on the basis of the weights of the driving target members (8 to 10).

The present third embodiment produces the following actions and effects in addition to actions and effects similar to those of the first embodiment.

(8) According to the present third embodiment, the delay time can be prevented from being changed even when the set weight becomes heavier or lighter due to the replacement of a driving target member (for example, the bucket 10) or the like. When the set weight becomes heavier due to the replacement of the driving target member, the delay time is as follows. In the present third embodiment, when the driving target member (for example, the bucket 10) is operated in the gravitational direction, the corrected pressure Pmax1 becomes lower than before the replacement. Therefore, the delay time can be prevented from becoming smaller than before the replacement, and similar delay times can be provided before and after the replacement. When the driving target member (for example, the bucket 10) is operated in the opposite direction from the gravitational direction, the corrected pressure Pmax1 becomes higher than before the replacement. Therefore, the delay time can be prevented from becoming larger than before the replacement, and similar delay times can be provided before and after the replacement.

When the set weight becomes lighter due to the replacement of the driving target member, the delay time is as follows. In the present third embodiment, when the driving target member (for example, the bucket 10) is operated in the gravitational direction, the corrected pressure Pmax1 becomes higher than before the replacement. Therefore, the delay time can be prevented from becoming larger than before the replacement, and similar delay times can be provided before and after the replacement. When the driving target member (for example, the bucket 10) is operated in the opposite direction from the gravitational direction, the corrected pressure Pmax1 becomes lower than before the replacement. Therefore, the delay time can be prevented from becoming smaller than before the replacement, and similar delay times can be provided before and after the replacement. That is, according to the present third embodiment, the delay time can be made uniform irrespective of the action directions and weights of the driving target members. As a result, the work device 1A can be actuated with high accuracy.

The following modifications are also within the scope of the present invention. It is possible to combine a configuration illustrated in a modification and a configuration described in a foregoing embodiment with each other, combine configurations described in the foregoing different embodiments with each other, or combine configurations described in following different modifications with each other.

First Modification

In the foregoing embodiments, description has been made of an example in which the controller 140 or 340 corrects the target pilot pressure Pi1 on the basis of the gravitational direction component VG of the action direction vector VD. However, the present invention is not limited to this. The controller 140 or 340 may correct the operation pilot pressure Pi0 on the basis of the gravitational direction component VG of the action direction vector VD. This configuration can uniformize variations in the delay time which variations are caused by an effect of gravity acting on the work device 1A at a time of a start of a manual operation. As a result, the operation feeling can be improved. That is, the present invention is applicable also to hydraulic excavators not having the MC function, and is capable of improving the operation feeling at a time of a start of operation and improving work accuracy by correcting the operation pilot pressure Pi0 at the time of the start of the operation.

Second Modification

In the foregoing embodiments, description has been made by taking as an example the hydraulic excavator 1 including the electric operation devices A1 to A6. However, the present invention is not limited to this. The present invention may be applied to a hydraulic excavator 1 including hydraulic pilot operation devices and capable of performing the intervening control. This hydraulic excavator 1 includes pilot lines to which target pilot pressures are output from solenoid valves (solenoid proportional pressure reducing valves) driven by control signals from the controller separately from the pilot lines to which operation pilot pressures are output from the pressure reducing valves of the operation devices. In this hydraulic excavator 1, the target pilot pressure is corrected as in the foregoing embodiments when the intervening control is performed, and thereby the delay time until the hydraulic actuators start to be driven can be made uniform irrespective of the posture and the action direction of each of the driving target members.

Third Modification

The controller 140 or 340 may correct the target pilot pressure Pi1 on the basis of the gravitational direction component VG of the action direction vector VD at a time of a start of the automatic control. It is thereby possible to uniformize variations in the delay time which variations are caused by an effect of gravity acting on the work device LA. As a result, an improvement in accuracy of work under the automatic control of the hydraulic excavator 1 can be achieved.

Fourth Modification

In the foregoing embodiments, description has been made of an example in which the target surface distance H used to compute the control intervention ratio a and the action direction vectors VBkC and VBkD of the bucket 10 are computed with the claw tip of the bucket as the reference point (control point). However, the present invention is not limited to this. For example, the target surface distance H and the action direction vectors VBkC and VBkD of the bucket 10 may be computed with an optional point on the rear end side of the bucket as the reference point (control point).

Fifth Modification

Gravitational direction components of action direction vectors of the swing structure 12 may be computed in consideration of an inclination angle in a left-right direction (roll angle) of the swing structure 12, and the command values of the pilot pressures to be generated by the solenoid valves 57*a* and 57*b* for operating the swing structure 12 may be corrected on the basis of a result of the computation.

The controller 140 according to the present modification has a configuration similar to that of the first embodiment (see FIG. 4, FIG. 6, and the like). The machine body inclination angle sensor 33 of the posture sensor 50 senses information indicating not only the inclination angle in the front-rear direction (pitch angle) of the swing structure 12 but also the inclination angle in the left-right direction (roll angle) of the swing structure 12 as the posture information of the swing structure 12, and outputs a result of the sensing to the controller 140.

The controller 140 computes the gravitational direction components of the action direction vectors of the swing structure 12 on the basis of the posture information of the work device 1A and the posture information of the swing structure 12, the posture information being sensed by the posture sensor 50. Description will be made concretely in the following. The reference point of the swing structure 12 as a starting point of the action direction vectors of the swing structure 12 is, for example, the position of a center of gravity of the swing structure 12 including the work device 1A.

The controller 140 computes the position of the reference point of the swing structure 12 on the basis of the sensing result of the posture sensor 50 as well as information such as the weight of each of the driving target members, the weight of the swing structure 12, the dimensions of each member, and the like, the information being stored in the nonvolatile memory 93. The controller 140 sets, as action directions, tangential directions at the reference point of the swing structure 12 on a circle having the swing central axis as a center thereof, and computes the action direction vectors. The controller 140 further computes the gravitational direction components of the action direction vectors of the swing structure 12.

When operation pilot pressures as the command values of the pilot pressures that are generated by the solenoid valves (solenoid valves for the motor) 57*a* and 57*b* and act on the pressure receiving chambers E7 and E8 of the flow control valve (motor control valve) D4 exceed a non-driving corresponding pressure (predetermined pressure) of the swing motor 4 and reach a driving corresponding pressure thereof, the controller 140 corrects the operation pilot pressures of the solenoid valves (solenoid valves for the motor) 57*a* and 57*b* on the basis of the gravitational direction components of the action direction vectors of the swing structure 12. The controller 140 outputs control signals corresponding to the operation pilot pressures after the correction of the solenoid valves (solenoid valves for the motor) 57*a* and 57*b* to the solenoid valves (solenoid valves for the motor) 57*a* and 57*b*.

According to the present fifth modification, a delay time from the application of control currents corresponding to the operation device A4 to the solenoid valves 57*a* and 57*b* to the driving of the swing motor 4 can be made uniform, for example, between a case where a left swing of the swing structure 12 is started from a state in which the swing structure 12 is inclined such that the left side of the swing structure 12 is located below the right side thereof and a case where a right swing of the swing structure 12 is started from the state.

Sixth Modification

In the foregoing embodiments, description has been made of a configuration in which the bucket 10 is coupled to the arm 9 so as to be rotatable only in one direction with respect to the arm 9. However, the present invention is not limited to this. The bucket 10 may be coupled to the arm 9 so as to be rotatable in a plurality of directions with respect to the arm 9. For example, when the direction of a central axis of the bucket pin is set as a first direction, the bucket 10 may be configured to be rotatable in a second direction orthogonal to the first direction and rotatable in a third direction orthogonal to the first direction and the second direction. In this case, when the controller performs the area limiting control, the controller may correct operation pilot pressures corresponding to an operation in the second direction of the bucket 10 (tilt operation) and an operation in the third direction (rotary operation) as in the foregoing embodiments.

Seventh Modification

The target surface data input device 51 may be an input device such as a switch or a keyboard that allows the operator to input a plurality of coordinate values indicating the target surface. The target surface data input device 51 may be a device that can obtain the position of the claw tip of the bucket 10 from the controller 140 on the basis of an operation performed by the operator, and input the coordinate values indicating the target surface to the controller 140 when an operation of inputting numerical values indicating a depth from the position is performed.

Eighth Modification

In the foregoing embodiments, description has been made of an example in which the work machine is the hydraulic excavator 1. However, the present invention is not limited to this. The present invention is applicable to various work machines including: hydraulic actuators; control valves that control flows of hydraulic operating fluid supplied from a hydraulic pump to the hydraulic actuators; and solenoid valves that output pilot pressures to the control valves.

Ninth Modification

A part or the whole of each configuration of the controller 140 or 340 and functions, execution processing, and the like of each such configuration may be implemented by hardware (for example, by designing logic for performing each function by an integrated circuit).

Tenth Modification

In the foregoing embodiments, control lines and information line construed as necessary for description are illustrated. However, not all of control lines and information lines of a product are necessarily illustrated. Almost all configurations may be considered to be actually interconnected.

Embodiments of the present invention have been described above. However, the foregoing embodiments merely represent a part of examples of application of the present invention, and are not intended to limit the technical scope of the present invention to concrete configurations of the foregoing embodiments.

DESCRIPTION OF REFERENCE CHARACTERS

1: Hydraulic excavator
1A: Work device
1B: Machine body (machine body)
2: Main pump (hydraulic pump)
4: Swing motor (hydraulic motor)
5: Boom cylinder (hydraulic actuator)
6: Arm cylinder (hydraulic actuator)
7: Bucket cylinder (hydraulic actuator)
8: Boom (driving target member)
9: Arm (driving target member)
10: Bucket (driving target member)
11: Track structure
12: Swing structure
18: Engine
30: Boom angle sensor (posture sensor)
31: Arm angle sensor (posture sensor)
32: Bucket angle sensor (posture sensor)
33: Machine body inclination angle sensor (posture sensor)
48: Pilot pump
50: Posture sensor
51: Target surface data input device
52: Position sensor
53: Display device
54*a*, 54*b*, 55*a*, 55*b*, 56*a*, 56*b*: Solenoid valve
57*a*, 57*b*: Solenoid valve (solenoid valve for a motor)
58*a*, 58*b*, 59*a*, 59*b*: Solenoid valve
60: Weight input device
61: Control valve unit
62: Solenoid valve unit
92: Processor
93: Nonvolatile memory (storage device)
94: Volatile memory (storage device)
96: Mode selector switch
140: Controller
141: Operation amount computing section
142: Posture computing section
143: Target surface setting section
144: Target velocity computing section
145: Target pilot pressure computing section
146: Command pilot pressure correcting section
147: Valve command computing section
148: Display control section
149: Actuator control section
340: Controller
346: Command pilot pressure correcting section
348: Display control section
360: Weight setting section
A1 to A6: Operation device
a: Control intervention ratio
b: Target surface invasion ratio
c: Area limitation ratio
D1 to D3: Flow control valve
D4: Flow control valve (motor control valve)
D5, D6: Flow control valve
G1: GNSS antenna
G2: GNSS antenna
H: Target surface distance
O: Origin
Pbk: Reference point
Pi0: Operation pilot pressure
Pi0': Corrected operation pilot pressure
Pi1: Target pilot pressure
Pi1': Corrected target pilot pressure
Pi2: Command pilot pressure
Pmax0, Pmax1: Corrected pressure
ps: Predetermined pressure (actuator non-driving corresponding
pressure)

St: Target surface
VD: Action direction vector
VG: Gravitational component of the action direction vector
Vst: Target surface vector
α: Boom angle
β: Arm angle
γ: Bucket angle
θ: Inclination angle (pitch angle)
φ: Angle of the action direction vector with respect to the target surface

The invention claimed is:

1. A work machine comprising:
a work device including a plurality of hydraulic actuators and a plurality of driving target members that are driven by the plurality of hydraulic actuators;
a posture sensor that senses posture information of the work device;
a hydraulic pump that supplies hydraulic operating fluid to the plurality of hydraulic actuators;
a control valve unit that controls flows of the hydraulic operating fluid supplied from the hydraulic pump to the plurality of hydraulic actuators;
a solenoid valve unit including a plurality of solenoid valves that generate pilot pressure for driving the control valve unit; and
a controller configured to compute a command value of the pilot pressure to be generated by the solenoid valves, and output a control signal corresponding to the command value to the solenoid valves,
the controller being configured to
compute a gravitational direction component of an action direction vector of the driving target members on a basis of the posture information sensed by the posture sensor,
correct the command value of the pilot pressure on a basis of the gravitational direction component of the action direction vector when the command value exceeds a predetermined pressure, and
output the control signal corresponding to the command value after the correction to the solenoid valves.

2. The work machine according to claim 1, wherein
the controller is configured to correct the command value of the pilot pressure to a higher value as the gravitational direction component of the action direction vector is increased, supposing that the gravitational direction component of the action direction vector in an opposite direction from a direction of gravity is a positive value, and supposing that the gravitational direction component of the action direction vector in the direction of gravity is a negative value.

3. The work machine according to claim 2, wherein
the controller is configured to set, as the command value after the correction, a predetermined corrected pressure higher than the command value before the correction when the command value before the correction exceeds the predetermined pressure, and compute the command value after the correction such that the command value after the correction gradually approaches the command value before the correction as an elapsed time increases.

4. The work machine according to claim 3, wherein
the controller is configured to raise the corrected pressure as the gravitational direction component of the action direction vector is increased.

5. The work machine according to claim 1, wherein
the controller is configured to
set weights of the driving target members on a basis of weight information input from an external device, and
correct the gravitational direction component of the action direction vector on a basis of the weights of the driving target members.

6. The work machine according to claim 1, wherein
the work machine includes:
a position sensor that senses positional information of a machine body of the work machine; and
an operation device for operating the work device,
the controller is configured to
obtain target shape data,
set a target surface on a basis of the obtained target shape data, the positional information of the machine body, and the posture information of the work device,
compute an operation pilot pressure so as to be along the target surface on a basis of an operation amount of the operation device,
compute a target pilot pressure such that a reference point determined in advance in the work device is along the target surface and does not cross the target surface,
compute a control intervention ratio that is increased as a distance from the reference point of the work device to the target surface is decreased,
compute a command pilot pressure on a basis of the operation pilot pressure, the target pilot pressure, and the control intervention ratio,
output a control signal corresponding to the command pilot pressure to the solenoid valves, and
correct the target pilot pressure on the basis of the gravitational direction component of the action direction vector when the target pilot pressure exceeds the predetermined pressure, and
a degree of effect produced on the command pilot pressure by the target pilot pressure is increased as the control intervention ratio is increased.

7. The work machine according to claim 6, wherein
the controller is configured to
compute angles of action direction vectors of the driving target members with respect to the target surface,
when the driving target members are operated by the operation device, determine whether or not the operation on the driving target members is an operation in a direction of approaching the target surface on a basis of the angles of the action direction vectors of the operated driving target members and the control intervention ratio,
compute a first command pilot pressure on a basis of the operation pilot pressure and output a control signal corresponding to the first command pilot pressure to the solenoid valves when determining that the operation on the driving target members is not an operation in the direction of approaching the target surface, and
compute a second command pilot pressure on a basis of the operation pilot pressure, the target pilot pressure, and the control intervention ratio and output a control signal corresponding to the second command pilot pressure to the solenoid valves when determining that the operation on the driving target members is an operation in the direction of approaching the target surface.

8. The work machine according to claim 1, wherein
the work machine includes:
a track structure;
a swing structure swingably attached to the track structure;
a hydraulic motor that drives the swing structure; and the work device attached to the swing structure, the control valve unit includes a motor control valve that controls a flow of the hydraulic operating fluid supplied from the hydraulic pump to the hydraulic motor, the solenoid valve unit includes a solenoid valve for the motor, the solenoid valve generating a pilot pressure for driving the motor control valve, the posture sensor senses posture information of the swing structure, and the controller is configured to compute a gravitational direction component of an action direction vector of the swing structure on a basis of the posture information of the work device and the posture information of the swing structure, the posture information being sensed by the posture sensor, correct a command value of a pilot pressure of the solenoid valve for the motor on a basis of the gravitational direction component of the action direction vector of the swing structure when the command value of the pilot pressure generated by the solenoid valve for the motor exceeds the predetermined pressure, and output a control signal corresponding to the command value after the correction of the solenoid valve for the motor to the solenoid valve for the motor.

* * * * *